United States Patent [19]
Clerkin et al.

[11] Patent Number: 6,007,150
[45] Date of Patent: Dec. 28, 1999

[54] MOTORCYCLE SEAT WITH ADJUSTABLE BACKREST

[75] Inventors: Colin R. Clerkin, Germantown; Richard R. Sinur, Grafton; Dean G. Troller, Milwaukee, all of Wis.

[73] Assignee: Milsco Manufacturing Company, Milwaukee, Wis.

[21] Appl. No.: 09/036,618

[22] Filed: Mar. 8, 1998

[51] Int. Cl.$^6$ ............................. B62J 1/00; B60N 2/20; B60N 2/22

[52] U.S. Cl. ............................. 297/215.12; 297/362.13; 297/378.1; 297/362.12

[58] Field of Search ......................... 297/215.11, 215.12, 297/195.1, 378.1, 362.1, 362.12, 362.13

[56] References Cited

U.S. PATENT DOCUMENTS

| | | |
|---|---|---|
| D. 246,879 | 1/1978 | Hanagan . |
| D. 247,011 | 1/1978 | Hanagan . |
| D. 247,796 | 5/1978 | Hanagan . |
| D. 279,332 | 6/1985 | Diffrient . |
| D. 305,843 | 2/1990 | Haukvik et al. . |
| D. 329,771 | 9/1992 | Zacharkow . |
| D. 341,952 | 12/1993 | Kelly . |
| D. 358,515 | 5/1995 | Adat et al. . |
| D. 368,818 | 4/1996 | Adat et al. . |
| 2,978,376 | 4/1961 | Hulse . |
| 3,215,468 | 11/1965 | Swenson et al. . |
| 3,215,470 | 11/1965 | Swenson et al. . |
| 3,258,511 | 6/1966 | McGregor, Jr. . |
| 3,412,967 | 11/1968 | Swenson et al. . |
| 3,445,143 | 5/1969 | Swenson . |
| 3,486,767 | 12/1969 | Lujan . |
| 3,519,240 | 7/1970 | Swenson . |
| 3,612,606 | 10/1971 | Swenson . |
| 3,616,013 | 10/1971 | Bocchi . |
| 3,712,673 | 1/1973 | Swenson . |
| 3,727,974 | 4/1973 | Swenson et al. . |
| 3,740,014 | 6/1973 | Swenson et al. . |

(List continued on next page.)

FOREIGN PATENT DOCUMENTS 556374  7/1923  France ................................ 297/378.1

OTHER PUBLICATIONS

Photos A1–A10: backrest mounting assembly for a motorcycle seat.
Photos B1–B4: backrest and backrest mounting assembly for a motorcycle seat.

(List continued on next page.)

*Primary Examiner*—Anthony D. Barfield
*Attorney, Agent, or Firm*—Nilles & Nilles SC

[57] ABSTRACT

A motorcycle seat having a backrest that is angularly adjustable, height adjustable and removable, all without requiring any tool. The backrest is mounted by a bracket to a pivot bracket carried by a frame of a backrest adjustment assembly all of which are disposed below the surface of the seat cushion. The assembly has a prime mover coupled to the frame and pivot bracket and communicates by cable with an actuator allowing selective angular backrest adjustment. The prime mover preferably is a gas cylinder, such as a rigid-in-compression gas spring, or a ball screw. The mounting bracket is pivotally coupled to the pivot bracket and has a coil spring between brackets which urges the mounting bracket rearwardly against the pivot bracket permitting the backrest to be manually urged forwardly to permit entry or exit from the seat and returning to its adjusted position when released. The mounting bracket has a pocket into which a post of the backrest is received and a retaining leaf which engages the post to retain it. The leaf can be urged away from the pocket to remove the post and backrest. A backrest cushion is mounted by a slide to the post and uses a reciprocable spring biased shaft which rides in a detent slot in the post enabling the height of the cushion to be adjusted.

54 Claims, 12 Drawing Sheets

U.S. PATENT DOCUMENTS

| | | |
|---|---|---|
| 3,932,252 | 1/1976 | Woods . |
| 3,938,858 | 2/1976 | Drabert et al. . |
| 3,948,558 | 4/1976 | Obermeier et al. . |
| 3,951,373 | 4/1976 | Swenson et al. . |
| 3,957,312 | 5/1976 | Bonnaud . |
| 3,973,797 | 8/1976 | Obermeier et al. . |
| 3,994,469 | 11/1976 | Swenson et al. . |
| 4,018,479 | 4/1977 | Ball . |
| 4,029,283 | 6/1977 | Swenson et al. . |
| 4,029,284 | 6/1977 | Swenson . |
| 4,030,750 | 6/1977 | Abram . |
| 4,036,525 | 7/1977 | Howk . |
| 4,046,611 | 9/1977 | Sanson . |
| 4,072,287 | 2/1978 | Swenson et al. . |
| 4,089,919 | 5/1978 | Sanson . |
| 4,095,820 | 6/1978 | Hanagan . |
| 4,103,858 | 8/1978 | Swenson . |
| 4,114,213 | 9/1978 | Beernaerts et al. . |
| 4,125,285 | 11/1978 | Hanagan . |
| 4,148,522 | 4/1979 | Sakurada et al. . |
| 4,148,525 | 4/1979 | Yamanashi . |
| 4,154,477 | 5/1979 | Swenson et al. . |
| 4,155,593 | 5/1979 | Swenson et al. . |
| 4,156,544 | 5/1979 | Swenson et al. . |
| 4,165,901 | 8/1979 | Swenson et al. . |
| 4,181,357 | 1/1980 | Swenson et al. . |
| 4,182,533 | 1/1980 | Ardnt et al. . |
| 4,185,342 | 1/1980 | Young . |
| 4,186,937 | 2/1980 | Schultz . |
| 4,188,697 | 2/1980 | Hanagan . |
| 4,190,697 | 2/1980 | Ahrens . |
| 4,196,931 | 4/1980 | Werner . |
| 4,221,430 | 9/1980 | Frobose . |
| 4,222,555 | 9/1980 | Eimen . |
| 4,225,183 | 9/1980 | Hanagan et al. . |
| 4,247,348 | 1/1981 | Lischer . |
| 4,302,047 | 11/1981 | Esser . |
| 4,307,913 | 12/1981 | Spiegelhoff . |
| 4,313,639 | 2/1982 | Ware . |
| 4,316,631 | 2/1982 | Lenz et al. . |
| 4,332,418 | 6/1982 | Strowik . |
| 4,353,577 | 10/1982 | Giordani . |
| 4,364,605 | 12/1982 | Meiller . |
| 4,375,295 | 3/1983 | Volin . |
| 4,392,686 | 7/1983 | Beer . |
| 4,405,681 | 9/1983 | McEvoy . |
| 4,406,496 | 9/1983 | Drabert et al. . |
| 4,420,447 | 12/1983 | Nakashima . |
| 4,425,910 | 1/1984 | Meiller . |
| 4,432,582 | 2/1984 | Weismann et al. . |
| 4,439,053 | 3/1984 | Pelz . |
| 4,449,751 | 5/1984 | Murphy et al. . |
| 4,451,084 | 5/1984 | Seeley . |
| 4,462,634 | 7/1984 | Hanagan . |
| 4,466,660 | 8/1984 | Mabie . |
| 4,475,770 | 10/1984 | Persons, II . |
| 4,509,793 | 4/1985 | Weismann et al. . |
| 4,533,110 | 8/1985 | Hill . |
| 4,541,670 | 9/1985 | Morganstern et al. . |
| 4,561,621 | 12/1985 | Hill . |
| 4,563,038 | 1/1986 | Hirose . |
| 4,570,998 | 2/1986 | Hughes . |
| 4,573,739 | 3/1986 | Schottker . |
| 4,576,410 | 3/1986 | Harrori . |
| 4,582,360 | 4/1986 | Becker . |
| 4,593,875 | 6/1986 | Hill . |
| 4,596,422 | 6/1986 | Stahel . |
| 4,615,551 | 10/1986 | Kinaga et al. . |
| 4,621,864 | 11/1986 | Hill . |
| 4,627,662 | 12/1986 | Carter et al. . |
| 4,632,335 | 12/1986 | Drabert et al. . |
| 4,639,039 | 1/1987 | Donovan . |
| 4,640,548 | 2/1987 | Desanta . |
| 4,641,886 | 2/1987 | Dauphin . |
| 4,647,109 | 3/1987 | Christopherson et al. . |
| 4,655,471 | 4/1987 | Peek . |
| 4,660,885 | 4/1987 | Suhr et al. . |
| 4,662,597 | 5/1987 | Uecker et al. . |
| 4,668,013 | 5/1987 | Wahlmann . |
| 4,673,214 | 6/1987 | Meiller . |
| 4,687,250 | 8/1987 | Esche . |
| 4,709,961 | 12/1987 | Hill . |
| 4,709,962 | 12/1987 | Steinmann . |
| 4,709,963 | 12/1987 | Uecker et al. . |
| 4,718,727 | 1/1988 | Sheppard . |
| 4,722,569 | 2/1988 | Morganstern et al. . |
| 4,726,086 | 2/1988 | McEvoy . |
| 4,740,417 | 4/1988 | Tornero . |
| 4,743,065 | 5/1988 | Meiller . |
| 4,744,600 | 5/1988 | Inoue . |
| 4,744,848 | 5/1988 | Andrews et al. . |
| 4,755,411 | 7/1988 | Wing et al. . |
| 4,773,706 | 9/1988 | Hinrichs . |
| 4,776,632 | 10/1988 | Akimori et al. . |
| 4,779,925 | 10/1988 | Heinzel . |
| 4,792,181 | 12/1988 | Guichon . |
| 4,804,225 | 2/1989 | Fourrey et al. . |
| 4,806,094 | 2/1989 | Rhodes, Jr. et al. . |
| 4,810,033 | 3/1989 | Kemmann . |
| 4,810,034 | 3/1989 | Beier . |
| 4,818,020 | 4/1989 | Meiller et al. . |
| 4,818,331 | 4/1989 | Shimada . |
| 4,836,609 | 6/1989 | Hill . |
| 4,838,514 | 6/1989 | Hill . |
| 4,840,426 | 6/1989 | Vogtherr et al. . |
| 4,868,888 | 9/1989 | Dayton . |
| 4,887,865 | 12/1989 | Dawidzon . |
| 4,890,881 | 1/1990 | Ollat et al. . |
| 4,909,568 | 3/1990 | Dal Monte . |
| 4,915,448 | 4/1990 | Morgenstern . |
| 4,953,911 | 9/1990 | Hanagan . |
| 4,966,412 | 10/1990 | Dauphin . |
| 4,968,093 | 11/1990 | Dal Monte . |
| 5,026,116 | 6/1991 | Dal Monte . |
| 5,026,119 | 6/1991 | Frank et al. . |
| 5,100,200 | 3/1992 | Keusch et al. . |
| 5,102,193 | 4/1992 | Goss et al. ......................... 297/362.13 |
| 5,121,968 | 6/1992 | Eppler . |
| 5,127,621 | 7/1992 | Uecker et al. . |
| 5,154,393 | 10/1992 | Lorbiecki . |
| 5,154,402 | 10/1992 | Hill et al. . |
| 5,169,112 | 12/1992 | Boyles et al. . |
| 5,176,356 | 1/1993 | Lorbiecki et al. . |
| 5,181,762 | 1/1993 | Beumer . |
| 5,183,314 | 2/1993 | Lorbiecki . |
| 5,193,880 | 3/1993 | Keusch et al. . |
| 5,209,548 | 5/1993 | Locher . |
| 5,221,071 | 6/1993 | Hill . |
| 5,222,783 | 6/1993 | Lai . |
| 5,251,958 | 10/1993 | Roericht et al. . |
| 5,263,768 | 11/1993 | Scheulderman . |
| 5,269,588 | 12/1993 | Kunz et al. . |
| 5,286,088 | 2/1994 | Taylor et al. . |
| 5,308,144 | 5/1994 | Korn . |
| 5,344,211 | 9/1994 | Adat et al. . |
| 5,344,215 | 9/1994 | Dahlbacka . |
| 5,356,201 | 10/1994 | Olson . |
| 5,364,060 | 11/1994 | Donovan et al. . |
| 5,364,162 | 11/1994 | Bar et al. . |
| 5,366,274 | 11/1994 | Roericht et al. . |
| 5,380,063 | 1/1995 | Dauphin . |
| 5,397,168 | 3/1995 | Hand . |

| | | |
|---|---|---|
| 5,419,615 | 5/1995 | Dozsa-Farkas . |
| 5,447,357 | 9/1995 | Dauphin . |
| 5,498,381 | 3/1996 | Lorbiecki et al. . |
| 5,499,861 | 3/1996 | Locher . |
| 5,511,852 | 4/1996 | Kusiak et al. . |
| 5,518,291 | 5/1996 | Shaide . |
| 5,524,969 | 6/1996 | Harrison et al. . |
| 5,538,326 | 7/1996 | Lorbiecki . |
| 5,544,937 | 8/1996 | Hanagan . |
| 5,547,251 | 8/1996 | Axelson . |
| 5,547,252 | 8/1996 | Pfenniger . |
| 5,549,357 | 8/1996 | Counts et al. . |
| 5,553,915 | 9/1996 | Stamatakis . |
| 5,553,917 | 9/1996 | Adat et al. . |
| 5,575,095 | 11/1996 | Korn . |
| 5,586,809 | 12/1996 | Szmadzinski . |
| 5,586,833 | 12/1996 | Vossmann et al. . |
| 5,588,698 | 12/1996 | Hsueh . |
| 5,599,066 | 2/1997 | Chih . |
| 5,608,957 | 3/1997 | Hanagan . |
| 5,624,158 | 4/1997 | Adat et al. . |
| 5,634,380 | 6/1997 | Scholz et al. . |
| 5,634,689 | 6/1997 | Putsch et al. . |
| 5,641,205 | 6/1997 | Schmidt . |
| 5,658,045 | 8/1997 | Van Koolwijk et al. . |
| 5,658,050 | 8/1997 | Lorbiecki . |
| 5,664,838 | 9/1997 | Baloche . |
| 5,711,575 | 1/1998 | Hand et al. . |
| 5,713,633 | 2/1998 | Lu . |
| 5,725,138 | 3/1998 | Zagrodnik . |
| 5,738,410 | 4/1998 | Stroud et al. . |
| 5,743,979 | 4/1998 | Lorbiecki . |
| 5,749,627 | 5/1998 | Perego . |

OTHER PUBLICATIONS

Photos C1–C12: Saddlegel.

Photos D1–D8: Mustang Softail.

Photos E1–E5: FLT Rider Backrest.

Photo F: Passenger Backrest (Sissy Bar).

Mechlok, single or dual linear locking device with remote control, P.L. Porter Company. Undated brochure.

Electrilok, a three component electric drive system, P.L. Porter Company. Undated brochure.

Controls, mechanical controls and cable assemblies, P.L. Portr Company. Undated brochure.

Hydrolok, Ah18000 series hydraulic recline mechanism, P.L. Porter Company. Undated brochure.

PLP Standard Parts list and engineering drawings, Apr. 5, 1993.

P.L. Porter Co. Product Brochure, undated, 3 pages, fold–out.

P.L. Porter Co. Product Brochure, undated, 10 pages.

Mike Corbin Backrest and Hardware Installation instructions, undated, 2 pages with illustrations.

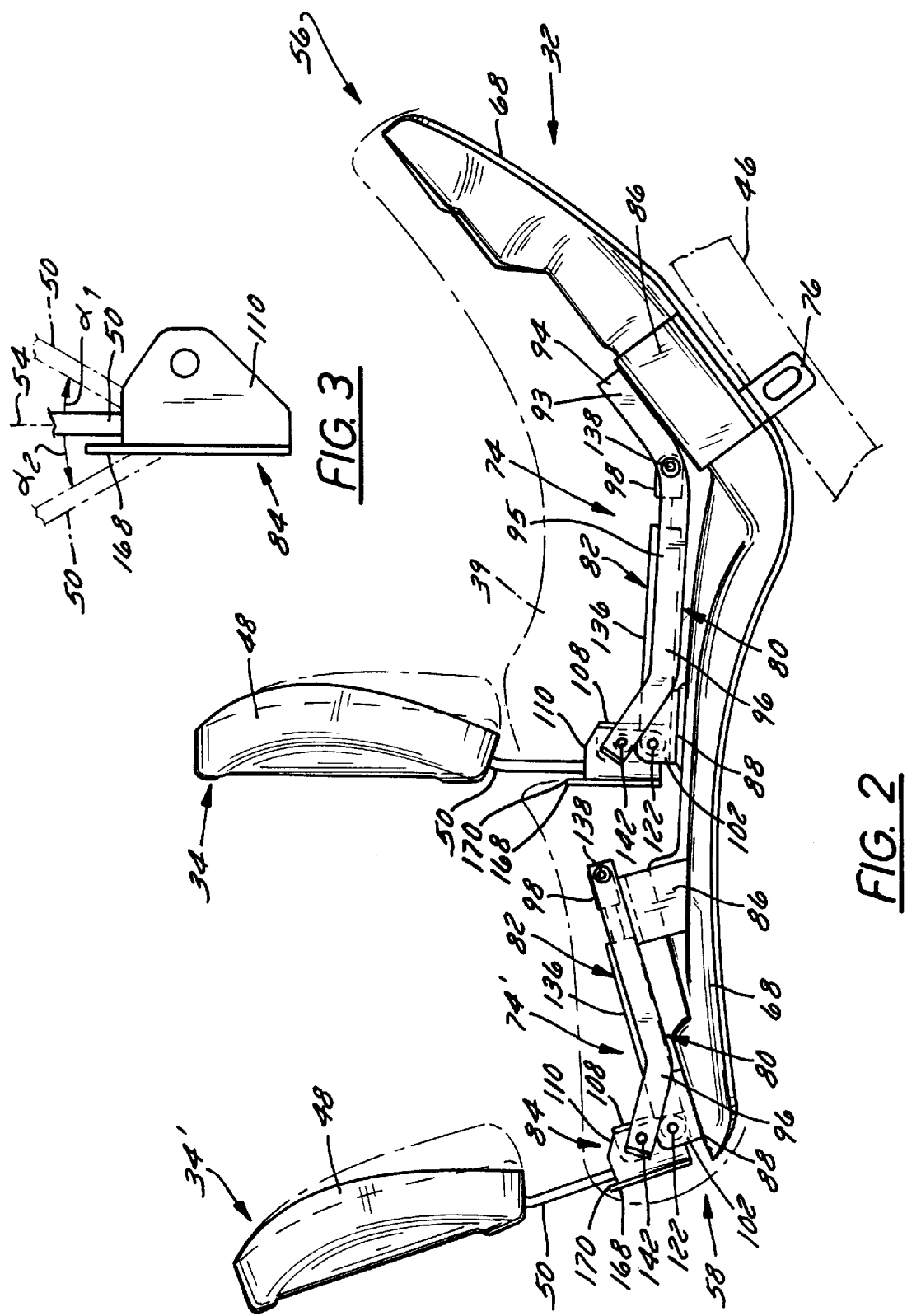

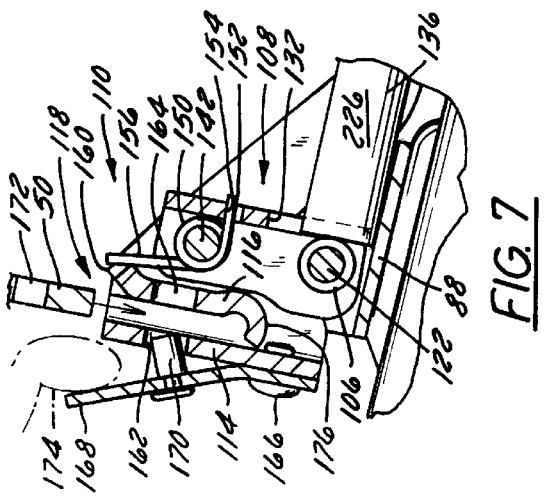
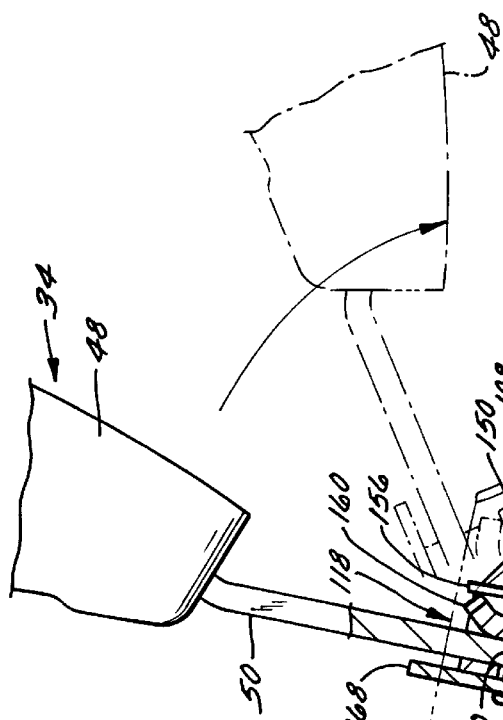
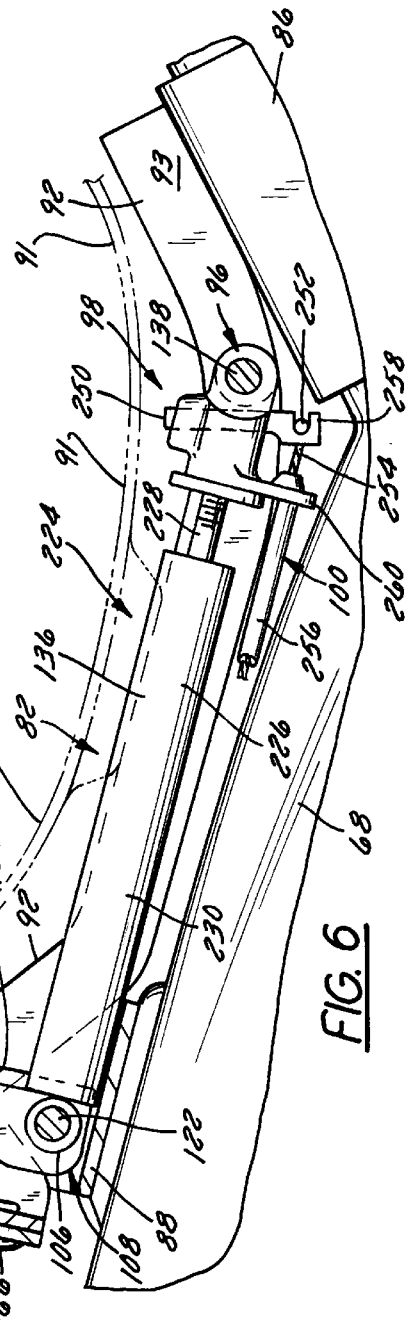

MOTORCYCLE SEAT WITH ADJUSTABLE BACKREST

FIELD OF THE INVENTION

This invention relates generally to a motorcycle seat and more specifically to a motorcycle seat having an adjustable backrest.

BACKGROUND OF THE INVENTION

Motorcycling is a popular leisure activity, the popularity of which seems to be ever increasing. Many motorcycling enthusiasts tour the country for several hours at a time sometimes for several days. This prevents challenges for motorcycle seat designers, because the comfort for both the motorcycle driver and passenger is paramount.

One device that has been used to improve the comfort of the driver is an adjustable backrest. Examples of such motorcycle seat backrests are found in Akimori et al., U.S. Pat. No. 4,776,632, and Frank et al., U.S. Pat. No. 5,026,119. While all of these backrests provide support to the middle and lower back of a seat occupant, they all suffer from severe limitations.

For example, the backrest disclosed in the '632 patent takes a considerable amount of time to adjust by rotation of a screw and can only be located behind the most rearwardly located seat occupant. Thus, only a single backrest of this disclosed construction can be used on a single motorcycle seat. This means that only one seat occupant will benefit by the backrest. Finally, this backrest is of rather complex and labor intensive construction and must be mounted to the frame of the motorcycle all of which increases assembly time and labor costs.

The backrest disclosed in the '119 patent is also attached to the frame of the motorcycle but is really best suited only for retrofit applications. In this backrest, the angle of the backrest cannot be adjusted, severely limiting the comfort the backrest can provide. Moreover, because of its construction, the entire backrest assembly must be manually removed in a time consuming and labor intensive manner should it be desired to temporarily forego the use of the backrest. Unfortunately, reinstallation is also labor intensive and time consuming. Finally, because of the rather bulky and obtrusive frame, a pair of these backrests cannot be installed on a single motorcycle seat severely limiting the versatility of this backrest.

What is needed is a motorcycle seat backrest that is selectively angularly adjustable and which requires no tools to make an angular adjustment. What is also needed is a motorcycle seat backrest having a backrest cushion that is vertically adjustable and which requires no tools to vertically adjust the cushion. What is still further needed is a backrest which can be completely and easily removed without the use of any tools. What is even still further needed is a motorcycle seat with an adjustable backrest that incorporates all of these features into a single unit.

What is further needed is an adjustable motorcycle seat backrest assembly that can be mounted to a single motorcycle seat either behind the driver or behind the passenger. What is still further needed is a motorcycle seat backrest adjustment assembly of compact construction such that two such assemblies that can be mounted to a single motorcycle seat with one such assembly located behind the driver and the other such assembly located behind the passenger. What is still further needed is a backrest and adjustment assembly that is modular and that can be assembled integrally as part of the motorcycle seat for minimizing labor and assembly costs, particularly when assembling the seat to a motorcycle.

SUMMARY OF THE INVENTION

A motorcycle seat having an adjustable backrest assembly that provides a backrest that is angularly adjustable, height adjustable and removable. The backrest preferably is angularly adjustable, height adjustable and removable all without the use of any tool.

To permit angle adjustment of the backrest, the backrest is coupled to an adjustable prime mover by a pivot bracket that is pivotally attached to a frame of a backrest angle adjustment assembly that is mounted to a base or seat pan of the motorcycle seat. To permit height adjustment of the backrest, the backrest has a cushion mounted to a movable slide on a post. To permit removal of the backrest, the post of the backrest is received and releasably retained in a pocket of a mounting bracket.

The frame of the backrest angle adjustment assembly preferably is of tubular construction having a pair of spaced apart longitudinally extending braces between which the prime mover is located. Each brace is mounted to the seat pan and is disposed below the seat occupant surface of the seat. The seat occupant supporting surface is the surface of the seat, typically its top surface, upon which a seat occupant rests. Each brace is mounted adjacent each end to the pan preferably by an anchor plate attached to the pan. If desired, at least a portion of the backrest angle adjustment assembly frame can be mounted directly to the motorcycle chassis.

Preferably, substantially the entire frame is covered by a relatively rigid shroud located below the seat occupant surface and which is fixed to the seat pan. Preferably, both the shroud, frame and prime mover are disposed below the seat cushion.

The prime mover has a shaft operably coupled to the backrest that can be moved to change the angle or tilt of the backrest and which is locked when the desired backrest angular position has been achieved. An actuator in operable communication with the prime mover is manipulated 1) so that the prime mover will permit adjustment of the angular position of the backrest and 2) to fix the adjusted angular position of the backrest by locking the angle adjustment setting of the prime mover.

The actuator is carried by the seat and preferably is coupled to a trigger of the prime mover by a cable. The cable has a knob, button, handle, or other component which can be manipulated to control operation of the prime mover thereby enabling the angle adjustment setting to be changed. In its preferred embodiment, the actuator preferably includes a latch that has a handle that is manipulable by a seat occupant 1) from an adjust position that enables the angle adjustment setting of the prime mover to be changed to change the backrest angle 2) to a locked position that prevents changing the angle adjustment setting.

The mounting bracket is pivotally coupled to the pivot bracket and is urged against the pivot bracket by a biasing element, that preferably is a torsion spring, which thereby urges the backrest rearwardly toward its adjusted angular position. The construction of the mounting bracket and pivot bracket permits the backrest to be folded forwardly against the seat cushion and away from the adjusted angular position without changing the angle adjustment setting to help get on or off the seat.

When the mounting bracket is against the pivot bracket, any displacement or change in length of the prime mover pivots the pivot bracket changing both the adjusted angular position of the backrest as well as the actual angle of the backrest. When the backrest is folded forwardly, any displacement or change in length by the prime mover will change the adjusted angular position of the backrest but not necessarily its actual angle. When released, the backrest will be urged backwardly until its actual angle is the same as the adjusted angular position defined by the pivot bracket such that the mounting bracket bears against the pivot bracket.

The mounting bracket has a pocket at the end of an access channel in the seat cushion into which the backrest post is inserted and releasably retained. The bracket has a retaining leaf, that preferably is a beam spring, which engages the post when the post is received in the pocket to retain the post thereby preventing unintentional removal of the backrest from the motorcycle seat. The beam spring has at least one and preferably a pair of outwardly extending bosses or dowels that are each received through a bore in the post to engage the post to prevent its removal from the pocket.

The beam spring is manually urged away from the bracket to withdraw the dowels until they do not unreasonably obstruct the pocket to permit the post to be inserted through the access channel into the pocket. With the post received in the pocket, the beam spring is released causing it to return toward the pocket. As it moves toward the pocket, each dowel is received in a bore in the post preventing the post from being removed from the pocket. To remove the backrest, one or more fingers are inserted into the channel to urge the beam spring away from the post until the dowels clear the post permitting the backrest to be lifted out of the pocket and removed from the seat.

The backrest cushion can be moved up or down on the post to adjust its height. The cushion is fixed to the slide which is movably mounted on the post. The slide has a movable height adjustment shaft that engages the post to prevent it and the cushion from moving relative to the post. The shaft can be moved between a height adjustment position that permits the cushion to be moved up or down and a locked position preventing cushion adjustment. The post has an elongate height adjustment slot with spaced detents that cooperate with the shaft such that the cushion can be moved between a number of discrete height positions on the post.

The shaft has a knob that captures a coil spring between it and the slide. When the shaft is manually urged inwardly toward the post, a groove of the shaft is received in the slot permitting the slide and cushion to be moved up or down along the post. When released, the groove clears the slot and a larger diameter portion of the shaft is received in the slot. When the larger diameter portion of the shaft is received in the slot, it engages a detent locking the position of the cushion. A relatively tight fit that preferably is an interference fit is provided between each detent and the larger diameter portion of the shaft to prevent slide and cushion movement.

In one preferred embodiment, the prime mover is an elongate, longitudinally extending cylinder with its shaft comprising a reciprocable piston. The piston preferably is pivotally coupled at its free end to a transverse mounting strut interconnecting the braces adjacent one end of the frame. The cylinder has a housing from which the piston extends with the cylinder housing preferably pivotally mounted at its free end to the pivot bracket. The pivot bracket is pivotally attached to each brace adjacent the opposite end of the frame.

In operation, movement of the piston changes the adjusted angular position of the backrest by changing the angle of the pivot bracket. To adjust the backrest angle, the actuator is moved to its adjust position and the backrest is manually urged to the desired angle. When the desired backrest angle is reached, the actuator is moved to the lock position causing the prime mover to lock its angular adjustment setting so the adjusted angular position of the backrest cannot be changed.

In its preferred embodiment, extension of the piston from the cylinder housing moves the adjusted angular position of the backrest forwardly and retraction of the piston into the housing moves the adjusted angular position of the backrest rearwardly. If desired, the piston can be pivotally mounted to the pivot bracket and the cylinder housing pivotally connected to the strut such that piston extension urges the backrest rearwardly and piston retraction urges the backrest forwardly.

The cylinder preferably is a gas spring having chambers between which gas and/or an oil can controllably flow when the actuator displaces the trigger such that the piston can be extended from or retracted into the cylinder housing. The cylinder has valving movable by the trigger between an adjust position permitting movement of the piston and a lock position that immobilizes piston when the desired backrest angle has been achieved. Preferably, the cylinder is a rigid-in-compression type gas spring.

In another preferred prime mover embodiment, the prime mover is a ball screw assembly having one end mounted to the strut and its other end mounted to the pivot bracket. Rotation of the threaded shaft of the ballscrew assembly cooperates with a ballscrew nut to change the angle of the backrest preferably by displacing either the shaft or nut. While rotation can be done manually, the ballscrew or its nut preferably is driven by a motor, such as a hydraulic, pneumatic or electric motor.

In another preferred embodiment, the prime mover is a mechanical spring having a cylinder with a reciprocable shaft extending therefrom. Movement of its trigger by manipulation of the actuator enables adjustment when the trigger is moved to one position and prevents adjustment when the trigger is moved to another position.

If desired, the prime mover can be another type of linear actuator such as for example, a coil spring, a hydraulic ram, a hydraulic cylinder, a pneumatic cylinder, or another type of linear actuator. If desired, the prime mover can be driven by a hydraulic, pneumatic or electric motor.

Objects, features and advantages of this invention are to provide a motorcycle seat having an integral backrest adjustment assembly that permits simple and easy backrest angle adjustment, backrest cushion height adjustment and backrest removal preferably all without requiring any tool; that has a range of backrest angle adjustment of at least 5°; that is infinitely angularly adjustable within its adjustment range; that permits the backrest to be folded forwardly out of the way to make room for someone to get on or off the seat; that permits the backrest to be folded forwardly without changing the angle adjustment setting; that folds forwardly and automatically returns to its adjusted angular position defined by the angle adjustment setting of the prime mover; that produces an aesthetically pleasing motorcycle seat as the backrest adjustment assembly components are hidden within the seat; that utilizes a prime mover and frame underneath the seat and which are of low profile construction such that seat comfort is unaffected; that enables quick and simple backrest angle adjustment; that is of compact construction permitting a single motorcycle seat to be equipped with a backrest adjustment assembly for the passenger and another backrest adjustment assembly for the driver; that is versatile in that the backrest height adjustment assembly and backrest can be modularly assembled prior to shipping and subsequent assembly to a seat; and that is an adjustable backrest that is rugged, simple, flexible, reliable, and durable, and which is of economical manufacture and is easy to assemble and use.

BRIEF DESCRIPTION OF THE DRAWINGS

FIG. 2 is an opposite side view of the motorcycle seat with its cushions depicted in phantom to show a seat pan frame of the seat and the construction of an adjustable backrest assembly of this invention.

FIG. 3 is a partial fragmentary view of the backrest post showing in phantom an exemplary range of forward and rearward angle of tilt from vertical.

FIG. 6 is a side view of the adjustable backrest assembly depicting a preferred prime mover of the adjustable backrest assembly and forward folding of the backrest to permit a driver to get on or off the seat.

FIG. 7 is a partial fragmentary cross sectional view of part of the adjustable backrest assembly depicting removal of the backrest.

DETAILED DESCRIPTION OF THE INVENTION

Figure 1:
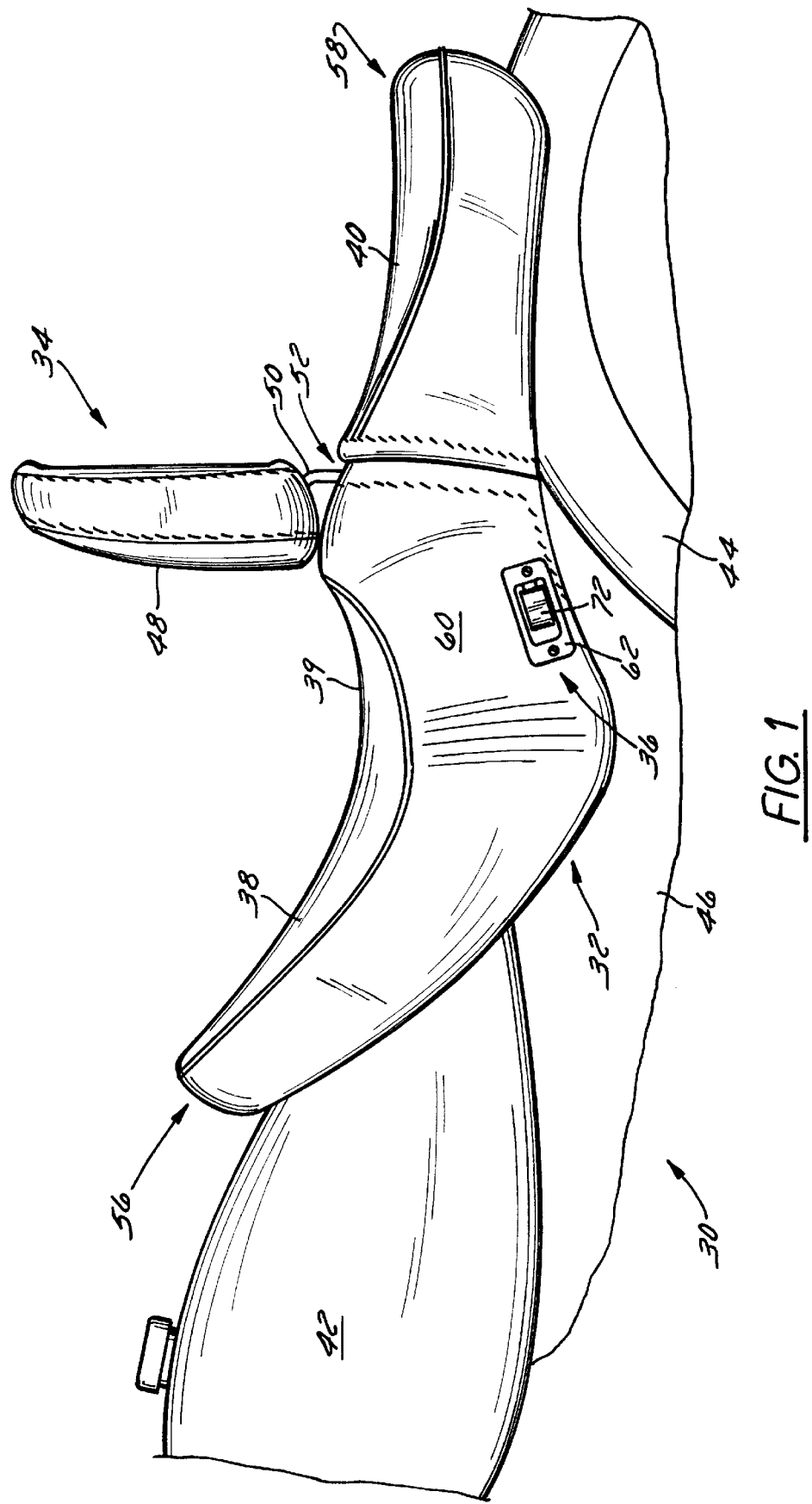
FIG. 1 is a side view of a motorcycle seat and backrest mounted on the chassis of a motorcycle.

FIG. 1 illustrates a portion of a motorcycle 30 having a motorcycle seat 32 with an adjustable backrest 34 of this invention which can be selectively angularly tilted, raised or lowered, and removed, all without requiring the use of any tool. The backrest 34 further includes a prime mover 82 operably coupled to the backrest 34 and an actuator mechanism 36 that is manipulated by a seat occupant 1) to permit the prime mover to selectively angularly tilt the backrest 34 forward or rearwardly and 2) to lock the position of the backrest 34 once the desired amount of tilt has been selected.

The prime mover 82 preferably is a linear actuator whose displacement changes the adjusted angular position of the backrest 34. The prime mover actuator mechanism 36 preferably is a knob, button or lever that communicates with the prime mover 82 to selectively enable or disable angular adjustment. The prime mover 82 is located below the top surface of the seat 32 and preferably is disposed underneath the seat cushion 39 to produce a backrest angle adjustment assembly 74 of compact and low profile construction that is hidden below the top surface of the seat 32 and contained within the seat 32.

The motorcycle 30 has a fuel tank 42 located forwardly of the seat 32. The tank 42, seat 32 and a fender 44 of the motorcycle 30 are supported by its chassis 46. Preferably, the seat 32 is securely mounted to the chassis 46. While the seat 32 preferably is mounted to the chassis using bolts or other types of fasteners, it can be mounted by other means including hook-and-loop fasteners, lug-and-slot engagement, straps, clamps and the like.

While the backrest 34 shown in FIG. 1 is located between the driver seat portion 38 and the passenger seat portion 40, a backrest 34' of this invention can also be mounted adjacent the rear of the seat, such as adjustable backrest 34' shown in phantom in FIG. 2. If desired, a single seat 32 can be equipped with a pair of such adjustable backrests 34 and 34' for providing back support and a wide range of added comfort for both the driver and passenger.

The backrest 34 has a padded cushion 48 mounted on a post 50 that extends downwardly into a channel 52 in the seat cushion 39 between the driver seat portion 38 and passenger seat portion 40. While the cushion 39 preferably is of one-piece construction, the cushion 39 can be of two-piece construction with the channel 52 disposed in one cushion piece or between the cushion pieces. Referring additionally to FIG. 3, the channel 52 is wide enough dimensionally from front 56 to back 58 of the seat 32 to permit the post 50 of the backrest 34 to be quickly and easily manually inserted into the seat 34 while also preferably permitting the backrest 34 to be angled forwardly or rearwardly and locked within a desirable backrest adjustment range.

For example, the preferred embodiment of the driver backrest angle adjustment assembly 74 shown in FIG. 2 have a range of adjustment between about $\alpha_1=23°$ forwardly of vertical line 54 and about $\alpha_2=13°$ rearwardly of vertical line 54 providing a total range of adjustment of approximately 36°. Preferably, the range of adjustment is at least 5° in each direction. Preferably, the range of adjustment is at least about 15° in each direction. If desired, the total range of adjustment can be as much as 45° or more. The vertical position of the backrest post 50 and therefore the backrest 34 is indicated by line 54 in FIG. 3.

The backrest actuator mechanism 36 preferably is anchored to or received in a sidewall 60 of the seat 32 by a recessed housing 62 received in a pocket (not shown) in the sidewall 60. The actuator 36 and housing 62 are preferably flush or close to flush with the sidewall 60. As is shown in FIG. 4, the housing 62 comprises a box 62 in which an actuator latch or button 72 is received and has a bottom flange 64 that is directly attached to a seat base 66, that preferably is a seat pan 68, preferably by a pair of fasteners 70 that preferably are rivets 70.

Figure 4:
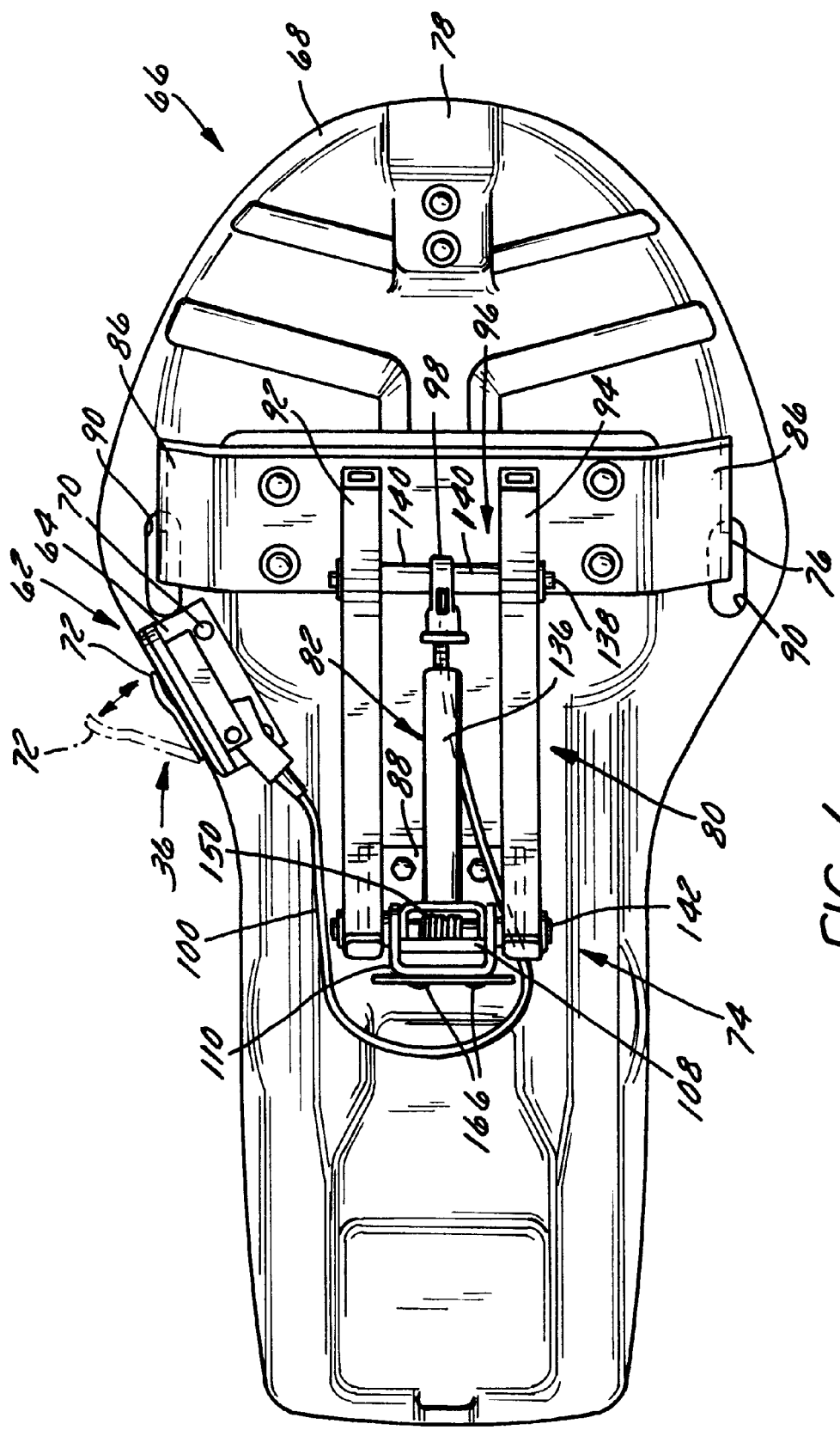
FIG. 4 is a top view of the motorcycle seat with its cushions removed for clarity to more clearly show the seat pan and adjustable backrest assembly.
Figure 5:
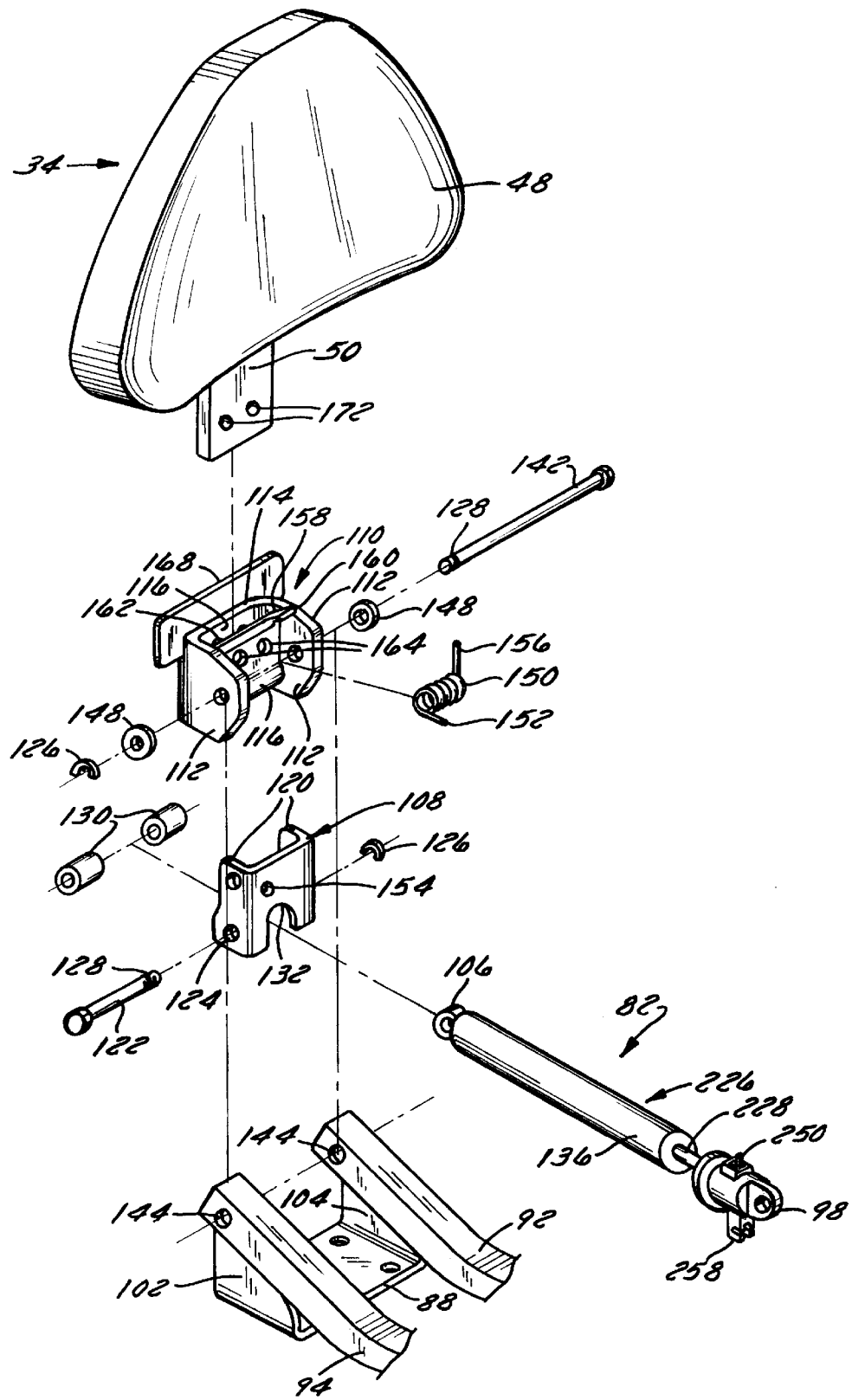
FIG. 5 is an exploded perspective view of a portion of the adjustable backrest assembly.

FIGS. 2, 4 and 5 illustrate the motorcycle seat with its seat cushion removed to show more clearly a preferred embodiment of the backrest angle adjustment assembly 74 of this invention which receives the backrest 34 and permits angular adjustment of the backrest 34. FIGS. 2 and 4 also show the seat pan 68 to which the backrest angle adjustment assembly 74 is mounted in more detail. The seat pan 68 forms a substantially rigid back bone of the seat 32 to which the backrest angle adjustment assembly 74 and seat cushion 39 are anchored. Preferably, the pan 68 is constructed of a synthetic material, such as high density polyethylene, ABS, or fiberglass, or a metal such as steel or aluminum.

Extending downwardly from each side of the pan 68 is a mounting lug 76 for mounting the pan 68 to the motorcycle chassis 46. Preferably, a fastener, such as a bolt (not shown) is used to mount each lug 76 to the chassis 46. The pan 68 also has a mounting tang 78 at its front end and another mounting lug at its rear (not shown) both of which are also used to mount the pan 68 to the chassis 46. If desired, other mounting or securing methods, components and devices can be used.

Each lug 76 preferably is part of an anchor plate 86 that not only reinforces the pan 68 but also is used to mount the backrest angle adjustment assembly 74 to the pan 68. Since the lugs 76 are also attached to the motorcycle chassis 46, the backrest angle adjustment assembly 74 is also anchored to the chassis 46.

The backrest angle adjustment assembly 74 includes a frame 80 anchored to the pan 68, the prime mover 82, and bracket assembly 84 operably coupled to the prime mover 82 and which also receives the post 50 of backrest 34. The prime mover 82 is oriented longitudinally relative to the seat pan 68. The prime mover 82 is coupled at one end to the frame 80 and pivotally connected at its other end to the bracket assembly 84. With the backrest 34 installed, the prime mover 82 is constructed and arranged such to permit selective angular adjustment of the backrest 34 while also being able to prevent angular movement of the backrest 34 in at least one direction when adjustment is completed and set.

The backrest angle adjustment assembly frame 80 is longitudinally oriented over the pan 68 and preferably is made of a metal, such as steel or aluminum, a plastic, or a synthetic material that is not plastic. Preferably, the frame 80 is tubular to produce a frame 80 that is lightweight and strong.

In its preferred embodiment, the frame 80 is disposed completely below the top surface or seat occupant surface of the seat 32. The seat occupant supporting surface is the surface of the seat, typically its top surface, upon which a seat occupant, such as the driver and/or a passenger, rests. Typically, the seat covering forms the seat occupant supporting surface.

In its preferred embodiment, the frame 80 is also disposed underneath the seat cushion 39 and can be received under or within a pocket in the cushion 39 having a cross sectional thickness less than another part of the cushion 39. Preferably, the cushion 39 is sufficiently thick where it overlies the frame 84 and prime mover 82 such that seat comfort is not compromised. The low profile construction permits use of a seat cushion 39 having a cross sectional thickness of as thin as about one inch where it overlies the frame 80. Preferably, the cushion 39 has a thickness of at least one inch everywhere.

In the preferred embodiment shown in phantom in FIG. 6, the frame 80 and prime mover 82 are covered by a protective shroud 91 that also serves to prevent a seat occupant from feeling the frame 80 or prime mover 82. The shroud 91 substantially completely overlies the frame 80 and prime mover 82 and has downwardly extending supporting sidewalls (not shown) that contact or converge with the seat pan 68. Preferably, the shroud 91 is mounted at its sidewalls to the pan 68. If desired, the pan 68 and shroud 91 can be constructed so they are integral or form a pan 68 and shroud 91 of one-piece unitary construction.

The shroud 91 is substantially rigid and strong to help transfer the weight of a seat occupant around the frame 84 and prime mover 82 to the pan 68. The shroud 91 is made of a metal, plastic or other synthetic material. The shroud 91 preferably is made of the same material as the pan 68.

As is shown more clearly in FIG. 4, the frame 80 is mounted at each end by an anchor plate 86 and 88 to the seat pan 68. Each plate 86 and 88 is mounted to the pan 68 by at least one fastener and preferably a pair of fasteners. Each fastener preferably is a rivet, screw or bolt but can be an adhesive or another fastening device such as a hook and loop fastener arrangement.

At least one anchor plate 86 preferably helps make the pan 68 more rigid and is used to help mount the pan 68 to the motorcycle chassis 46. Preferably, each of the seat mounting lugs 76 extend downwardly from each end of the front anchor plate 86 through a hole 90 in the pan 68. In this manner, the adjustable backrest assembly 74 is mounted directly to the chassis 46 of the motorcycle 30 for advantageously helping to produce a strong backrest angle adjustment assembly frame 80 that also is relatively flexurally rigid.

The frame 80 preferably is comprised of a pair of spaced apart longitudinally extending elongate braces 92 and 94 each comprised of a strong and resilient material that preferably is steel, aluminum or another metal but can be a suitable synthetic material. Preferably, each brace 92 and 94 is of tubular or hollow construction such that it is lightweight while still being strong. The front end of each brace 68 is securely mounted to the anchor plate 86 by a fastener or more preferably by welding or another adhesive joining process.

Referring to FIG. 2, each brace has three segments 93, 95 and 97 forming a somewhat U-shaped brace. Preferably, there is a curved transition between the forward segment 93 and middle segment 95 and the tail segment 97 and the middle segment 95. The forward segment of each brace 92 and 94 is angled upwardly to match the contour of the front of the pan 68 where it is mounted to the front anchor plate 86. Preferably, it is bent upwardly at between about a 30° and a 50° angle relative to the middle segment 95.

The tail segment 97 is also angled upwardly relative to the middle segment 95. The tail segment 97 is angled upwardly relative the middle segment preferably at an angle of between about 10° and about 30° relative to the middle segment 95 to locate the bracket assembly 84 such that its lowest portion clears both the pan 68 and anchor plate 88 during operation.

Adjacent the front anchor plate 86 is a mounting strut 96 that extends transversely from one brace 92 to the other brace 94 and to which one end of the prime mover 82 is attached. Preferably, the prime mover 82 has a mounting yoke 98 at one end that is pivotally mounted to the strut 96. The strut 96 preferably comprises a pin or bolt 138 that extends from one brace 92 to the other brace 94 carrying a pair of tubular spacers 140 that help center the yoke 98 between the braces 92 and 94 to help center the prime mover 82 between the braces 92 and 94. Extending from the actuator 36 to the yoke 98 is a cable 100 for communicating motion from the actuator 36 to the prime mover 82 for controlling operation of the prime mover 82 and hence controlling tilting of the backrest 34.

Referring to FIG. 5, the rear anchor plate 88 has a pair of upstanding ears 102 and 104 with one ear 102 extending around and fixed to brace 94 and the other ear 104 extending around and fixed to brace 92. Preferably, each ear 102 and 104 is fixed to its respective brace 92 and 94 by a weld or the like. The ears 102 and 104 space the tail ends of braces 92 and 94 from the rear anchor plate 88 and seat pan 68 to provide sufficient clearance for the backrest mounting bracket assembly 84 to pivot during angular adjustment of the backrest 34.

When mounted to the chassis 46, there preferably is a pad (not shown) disposed between the underside of the pan 68 and the top of the motorcycle fender 44. The pad is constructed of rubber or a synthetic material that preferably is neoprene or the like. The pad disperses the load from the seat 32 to the fender 44 and helps dampen vibration. If desired, the pad and rear anchor plate 88 can be of integral construction.

The opposite end of the prime mover 82 is mounted by a mounting eye 106 to the backrest mounting bracket assembly 84 which is pivotally mounted to each brace 92 and 94. The backrest mounting bracket assembly 84 includes a pivot bracket 108 pivotally mounted to each brace 92 and 94 and a backrest mounting bracket 110 pivotally mounted to the pivot bracket 108 for enabling the backrest 34. The pivot bracket 108 permits the entire bracket assembly 86 to pivot about its point of attachment to the braces 92 and 94 to permit the forward or rearward tilt of the backrest 34 in response to changes in length or displacement of the prime mover 82.

The mounting bracket 110 is pivotally attached to the pivot bracket 108 such that it can pivot independently of and relative to the pivot bracket 108 away from the pivot bracket 108 to permit the backrest 34 to pivot forwardly, even if the prime mover 82 is locked, so the backrest 34 can be folded against the seat 32 to provide clearance for a driver to get on or off the seat 32. Likewise, for adjustable passenger backrest assembly 74', this construction permits the backrest 34' to pivot forwardly to make it easier for a passenger to get on or off the seat 32.

The mounting bracket 110 has a pair of spaced apart generally right-angled arms 112, a rear wall 114 and a front wall 116 spaced from the rear wall 114 and located between the arms 112 defining a pocket 118 for releasably receiving the backrest post 50 therein. The pivot bracket 108 has a pair of generally right-angled outwardly extending flanges 120 defining a bracket 108 of generally U-shaped cross section.

The mounting eye 106 of the prime mover 82 is mounted to the pivot bracket 108 by a first headed pin 122 that extends outwardly through and beyond a set of lower coaxial bores 124 in the flanges 120. A retainer ring 126 is received in a groove 128 adjacent one end of the pin 122 to prevent the pin 122 from axially sliding free of the bracket flange 120. Carried by the pin 122 are a pair of tubular spacers 130 for helping to keep centered the mounting eye 106 of the prime mover 82 within an arcuate notch 132 in the body 134 of the bracket 108 that provides sufficient clearance for the bracket 108 to pivot relative to the prime mover 82 without bearing against any portion of the prime mover 82, particularly its housing 136.

The pivot bracket 108 and mounting bracket 110 are both mounted between the braces 92 and 94 by a second headed pivot pin 142 that has one end which extends outwardly through and beyond a bore 144 in one of the braces 92 and its other end which extends outwardly through and beyond a bore 146 in the other of the braces 94. The pin 142 extends through both flanges 120 of the pivot bracket 108 and through both arms 112 of the mounting bracket 110. A retainer clip 126 is received in a groove 128 in one end of the pin 142 to prevent the pin 142 from being axially slidably withdrawn from the braces 92 and 94 and brackets 108 and 110. A washer 148 that preferably is made of nylon is carried on the pin 142 adjacent each end and captured between a bracket arm 112 and one or both of the braces 92 and 94 or the pin 142.

Referring to both FIGS. 4 and 5, when assembled, the pivot bracket flanges 120 are nested between the backrest post arms 112 permitting the backrest mounting bracket 110 to pivot relative to the pivot bracket 108. Referring to FIG. 6, the nested and pivoting construction of the two brackets 108 and 110 permits the backrest mounting bracket 110 to pivot or "dump" forwardly to permit the backrest 34 to be tilted forwardly toward seat cushion 38 to permit the driver and passenger to more easily and without obstruction get onto or off their respective seat cushion 38 and 40.

When the mounting bracket 110 is pivoted rearwardly away from the seat saddle cushion 38, it bears against the pivot bracket 108 which functions as a stop when the prime mover 82 is locked to prevent further rearward pivoting of the bracket 110 and backrest 34. Thus, when the prime mover is 82 in a locked operating position fixing its angular adjustment setting, the pivot bracket 108 cannot pivot thereby preventing the mounting bracket 110 and backrest 34 from pivoting backwardly beyond the pivot bracket 108. However, with the prime mover 82 and pivot bracket 108 locked and not being able to move, the backrest 34 and mounting bracket 110 can still pivot forwardly because of the pivotal attachment between the mounting bracket 110 and pivot bracket 108.

To prevent the backrest 34 from simply freely flopping forwardly onto the seat saddle cushion 38, there is a biasing element that preferably is a torsion spring 150 coaxially carried by the second pivot 142. The spring 150 has a first tang 152 received in a slot 154 in the pivot bracket 108 and a second tang 156 retained by an outturned lip 160 of the front mounting bracket wall 116 to urge the mounting bracket 110 rearwardly against the pivot bracket 108 such that the actual angular position of the backrest 34 is the same as the adjusted angular position defined by the pivot bracket in response to the angular adjustment setting of the prime mover 82. Preferably, the torsion spring 150 is made from wire that can be, for example, of square or round cross section, and made of spring material that can be spring steel or preferably music wire to provide enough torque to keep the backrest 34 urged uprightly while allowing the backrest 34 to be manually urged relatively easily forwardly without a great deal of effort to permit a driver to get onto the seat 32.

Referring to FIGS. 6 and 7, the backrest 34 is easily removed from its mounting bracket 110 without requiring any tool. The rear wall 114 of the bracket 110 has a pair of spaced apart holes 162 and can have a pair of spaced apart holes 164 in its front wall 116. Mounted by a pair of fasteners 166, that preferably are rivets, to the rear wall 114 is a flat generally rectangular backrest post retaining leaf 168 that preferably is a beam spring which has a plurality of outwardly extending dowels 170 that are each simultaneously received in a rear wall hole 162 when the leaf 168 is disposed adjacent the rear wall 114 in its backrest retaining position (FIG. 6). Preferably, the leaf 168 is a relatively thin plate made of a spring-like and resilient material that preferably has a rolled top edge (not shown). Preferably, the leaf 168 is constructed of spring steel or another suitable resilient spring-like material.

The bottom portion of the backrest post 50 also has a pair of spaced apart bores 172 which generally coaxially align with the holes 162 in the rear bracket wall 114 when the mounting post 50 is received in the bracket retainer pocket 118. Referring to FIG. 7, to insert the post 50 of the backrest 34 into the pocket 118, at least one finger 174 is inserted into the channel 52 to urge the retaining leaf 168 outwardly away from its retaining position away from the rear wall 114 pulling the dowels 170 out of the retainer pocket 118 providing unobstructed insertion of the post 50 into the pocket 118. The post 50 is inserted into the pocket 118 until the end of the post 50 bottoms out against an inturned lip 176 of the bracket front wall 116. Outturned lip 160 helps guide the post 50 into the pocket 118 as insertion is done somewhat blind with the person inserting the post 50 into the pocket 118 proceeding at least partially by feel. When the post 50 is received in the pocket 118, the leaf 168 is released causing it to return toward its retaining position. As it returns, each dowel 170 passes through one of the holes 162 in the rear wall 114 and one of the bores 172 in the post 50 preventing removal of the post 50. The pair of spaced apart dowels 170 not only positively retain the backrest 34 but also prevent the backrest 34 from tilting side to side relative to the lengthwise axis of the seat 32.

To remove the backrest 34, one or more fingers 174 are inserted into the channel 52 to urge the leaf 168 away from its retaining position shown in FIG. 6 toward its released position shown in FIG. 7. As the leaf 168 is urged away from the mounting bracket 110 toward the released position, the dowels 170 withdraw from the bores 172 and holes 162 permitting the backrest 34 and post 50 to be lifted upwardly out of the pocket 118 and removed from the seat 34.

Figure 8:
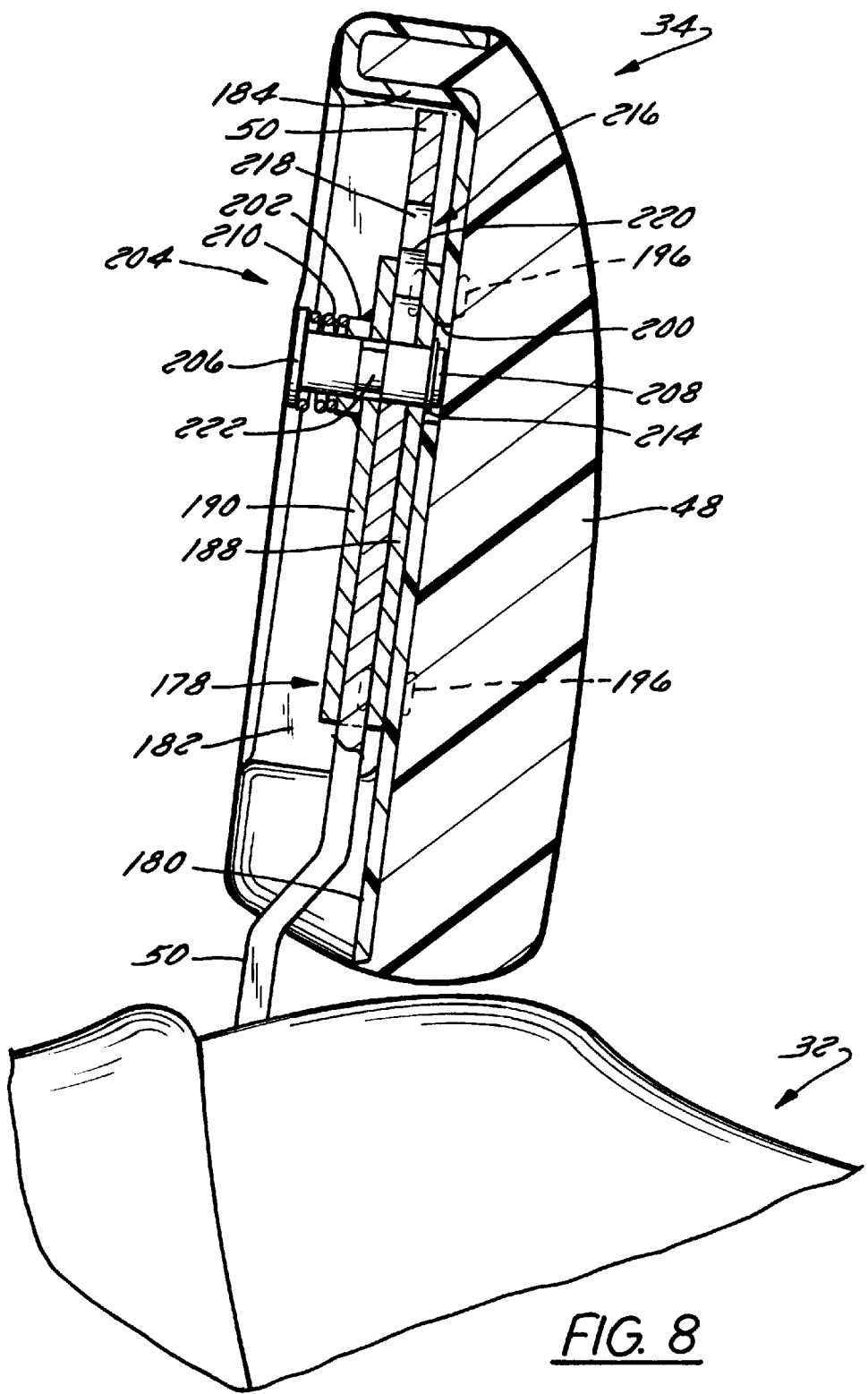
FIG. 8 is a cross sectional side view of the backrest showing its cushion and a backrest height adjustment slide assembly movably mounting the cushion to a post.
Figure 9:
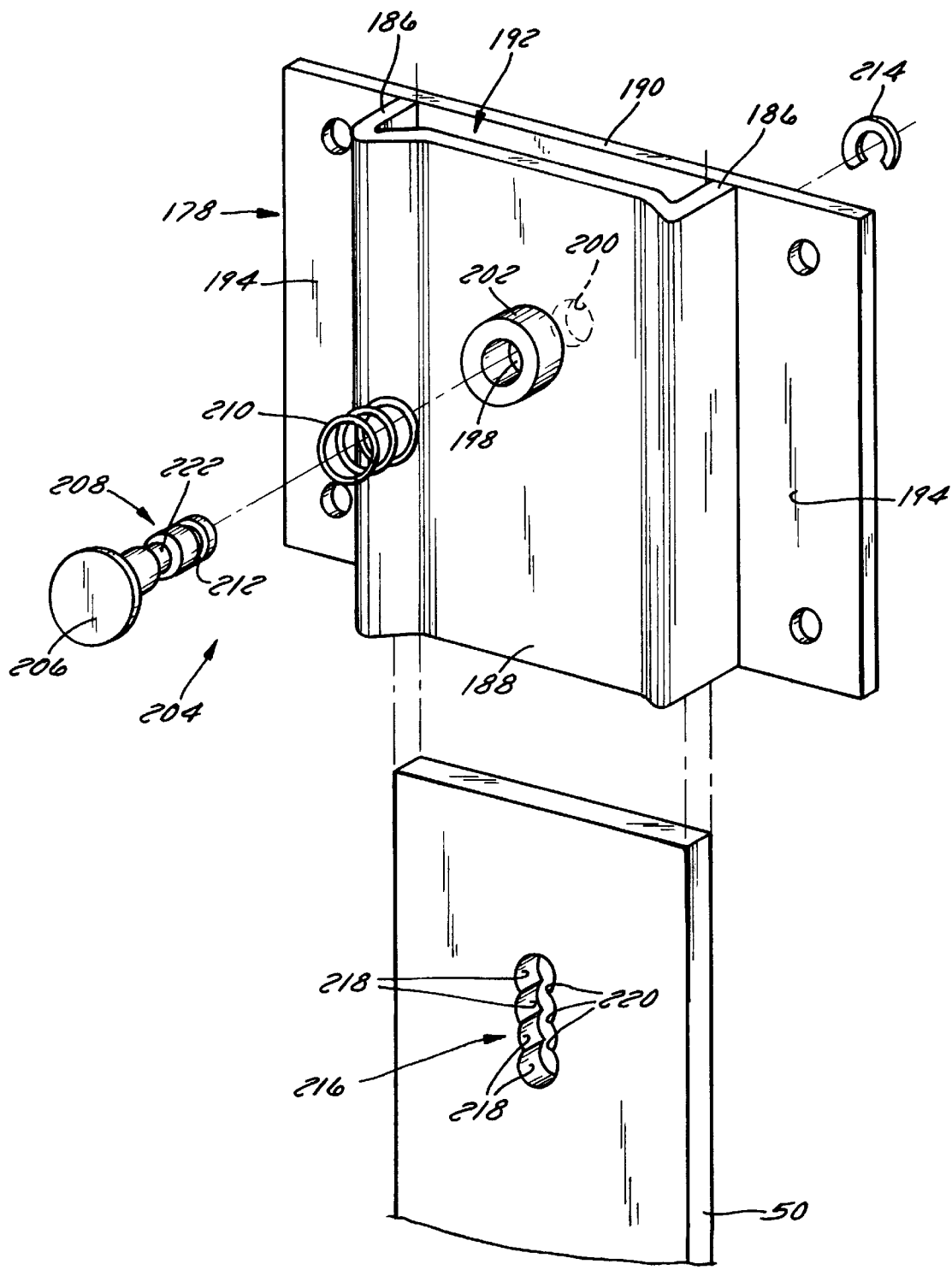
FIG. 9 is an enlarged exploded perspective view of the backrest height adjustment slide assembly.

Referring to FIGS. 8–11, the height of the backrest cushion 48 can be adjusted using a backrest height adjustment assembly 204 of this invention simply, easily and preferably without the use of any tool. As is shown in FIGS. 8 and 9, the cushion 50 is mounted by a slide 178 to the post 50 constructed and arranged to permit selective and slidable adjustment of the position of the cushion 48 on the post 50. The cushion 48 is mounted on a relatively rigid and resilient cushion back 180 having a recess 182 in which the slide 178 is mounted. The cushion back 180 has an outwardly extending flange portion 184 that can function as a stop 184 against which the free end of the post 50 can bear to limit downward height adjustment of the cushion 48.

As is shown in FIG. 9, the slide 178 has a pair of sidewalls 186, a front wall 188 and a rear wall 190 defining a generally rectangular post receiving channel 192 for receiving a post 50 of generally rectangular cross section. The front wall 188 of the slide 178 has a pair of outwardly extending flanges 194 each of which are attached to the cushion back 180 by a pair of fasteners 196 that are preferably rivets, bolts, screws, or the like. If desired, an adhesive or a hook and loop fastener can be used to attach the cushion 48 to the slide 178. The front wall 188 and rear wall 190 each have a bore 198 and 200 that are coaxially aligned and a coaxial generally annular ring 202 extends outwardly from the rear wall 188.

The rear wall 190 preferably is constructed with a centered and upraised ridge (not shown) that extends longitudinally the length of the wall 190 with the ridge broken by ring 202 defining a spring receiving channel (not shown) between the ring 202 and ridge located above the ring 202 and another spring receiving channel (not shown) between the ring 202 and ridge located below the ring 202. Preferably, part of spring 210 is telescoped over the ring 202 and received in the channels.

The backrest height adjustment assembly 204 has a knob 206 at one end and an elongate generally cylindrical shaft 208 extending outwardly from the knob 206. The shaft 208 is received in the washer 202 and bore 198 and captures coil spring 210 between the knob 206 and slide 178 which helps urge the height adjustment shaft 208 outwardly toward a locked position (FIG. 10) that keeps the backrest cushion 48 from sliding up or down the post 50. The shaft 208 has a groove 212 adjacent its free end for receiving a retainer ring 214 that prevents the shaft 208 from being completely withdrawn from the slide 178 and post 50. The retainer ring 214 is mounted to a portion of the shaft 208 that extends beyond the front slide wall 188 in front of rear wall 190.

The backrest post 50 has an elongate adjustment slot 216 through which the height adjustment shaft 208 passes when the post 50 is assembled to the slide 178. The adjustment slot 216 has a longitudinal length several times the diameter of the adjustment shaft 208, preferably at least an inch and preferably no more than three inches. The slot 216 preferably comprises a plurality of spaced apart detents 218 which preferably are a plurality of spaced apart pairs of inwardly extending projections 220 for enabling the backrest cushion 48 to be positioned at discrete locations representative of height adjustments on the post 50. The length of the slot 216 preferably limits how far the cushion 48 can be adjusted upwardly or downwardly.

The shaft 208 has a diametrically necked down portion or groove 222 disposed between its knob 206 and free end. The diameter of the necked down portion 222 is selected such that it is smaller than the narrowest portion 220 of the adjustment slot 216 to permit the backrest cushion 48 to move up or down on the post 50 when the necked down portion 222 of the shaft 208 is disposed in the slot 216.

Figure 10:
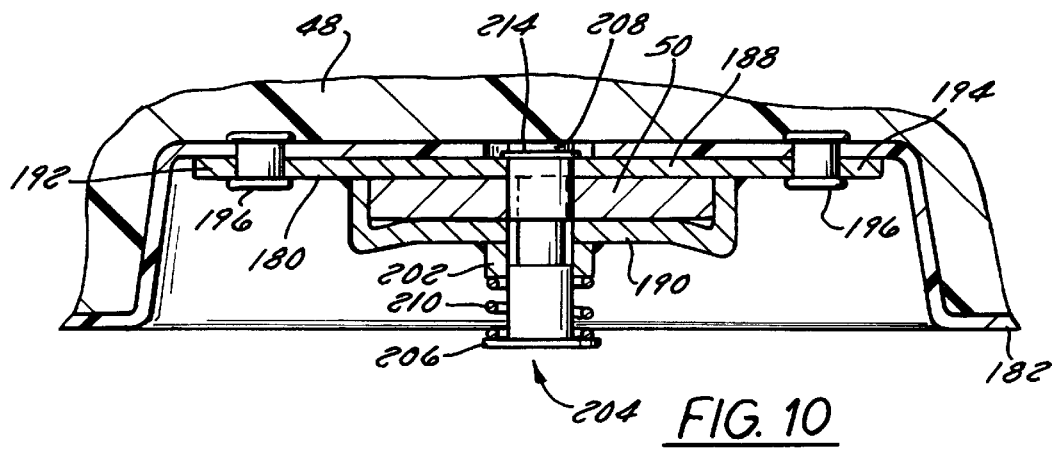
FIG. 10 is a partial fragmentary sectional top view of the backrest cushion showing the height adjustment slide in a locked position.
Figure 11:
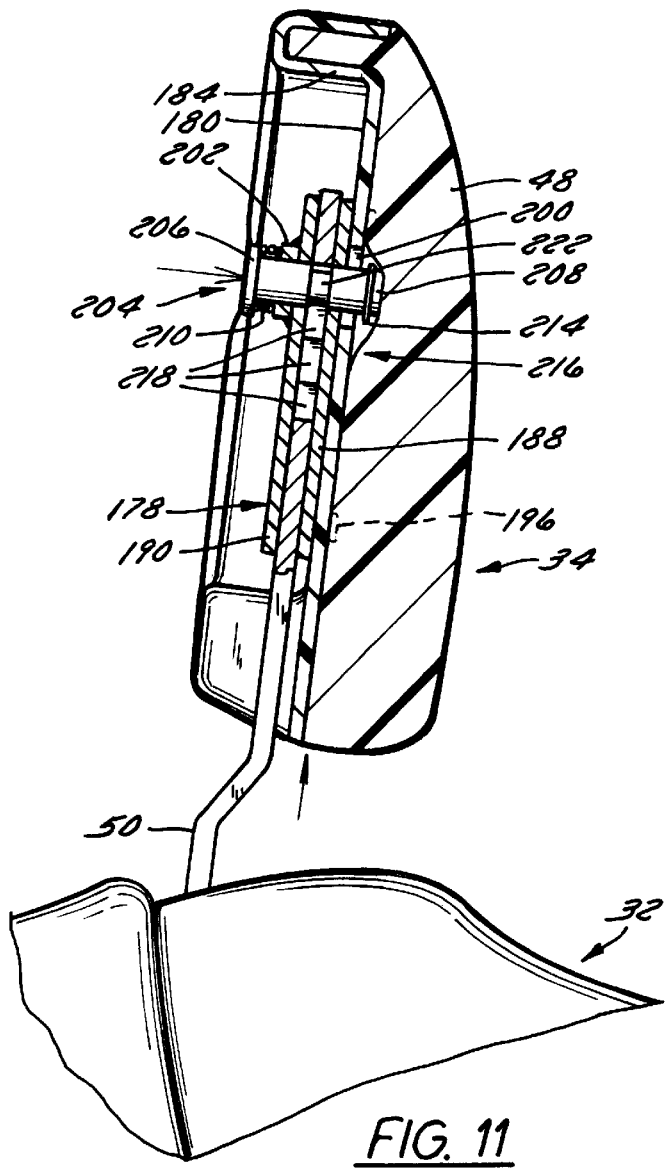
FIG. 11 is a partial fragmentary view of the height adjustment slide assembly shown in a height adjustment enabling position.

With the post 50 disposed in the slot 216 between a single pair of opposed arcuately shaped detents 218 as shown in FIG. 10 such that its diametrically necked down portion 222 is located outwardly of the slot 216, the height of the backrest cushion 48 cannot be changed. To change the height of the backrest cushion 48 the knob 206 of the shaft 208 is manually engaged and urged inwardly toward the cushion 48 in the direction of the arrow shown in FIG. 11 until the necked down shaft portion 222 is located in the backrest adjustment slot 216. When located in the slot 216, the height of the cushion 48 can be adjusted by manually grasping the cushion 48 and moving it along the post 50. When the desired backrest cushion height is selected, the shaft 208 is released returning to the position shown in FIG. 10 locking the backrest in place. When the shaft 208 returns to the locking position, the shaft 208 is received between a pair of opposed detents 218 with the projections 220 above and below the shaft 208 that bear against the shaft 208 preventing the cushion 48 from moving relative to the post 50.

Figure 12:
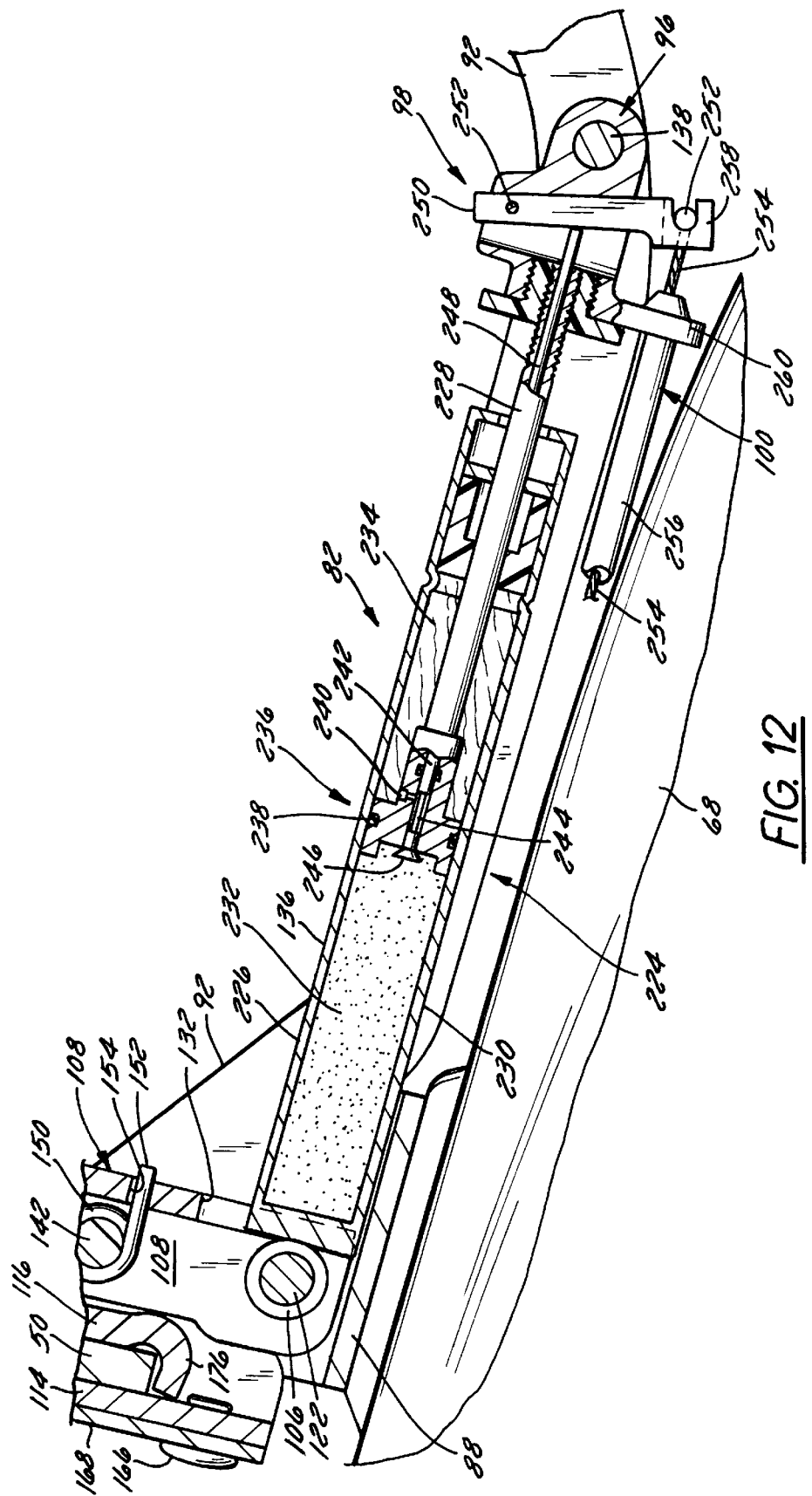
FIG. 12 is a side sectional view of the prime mover showing details of its internal construction.
Figure 13:
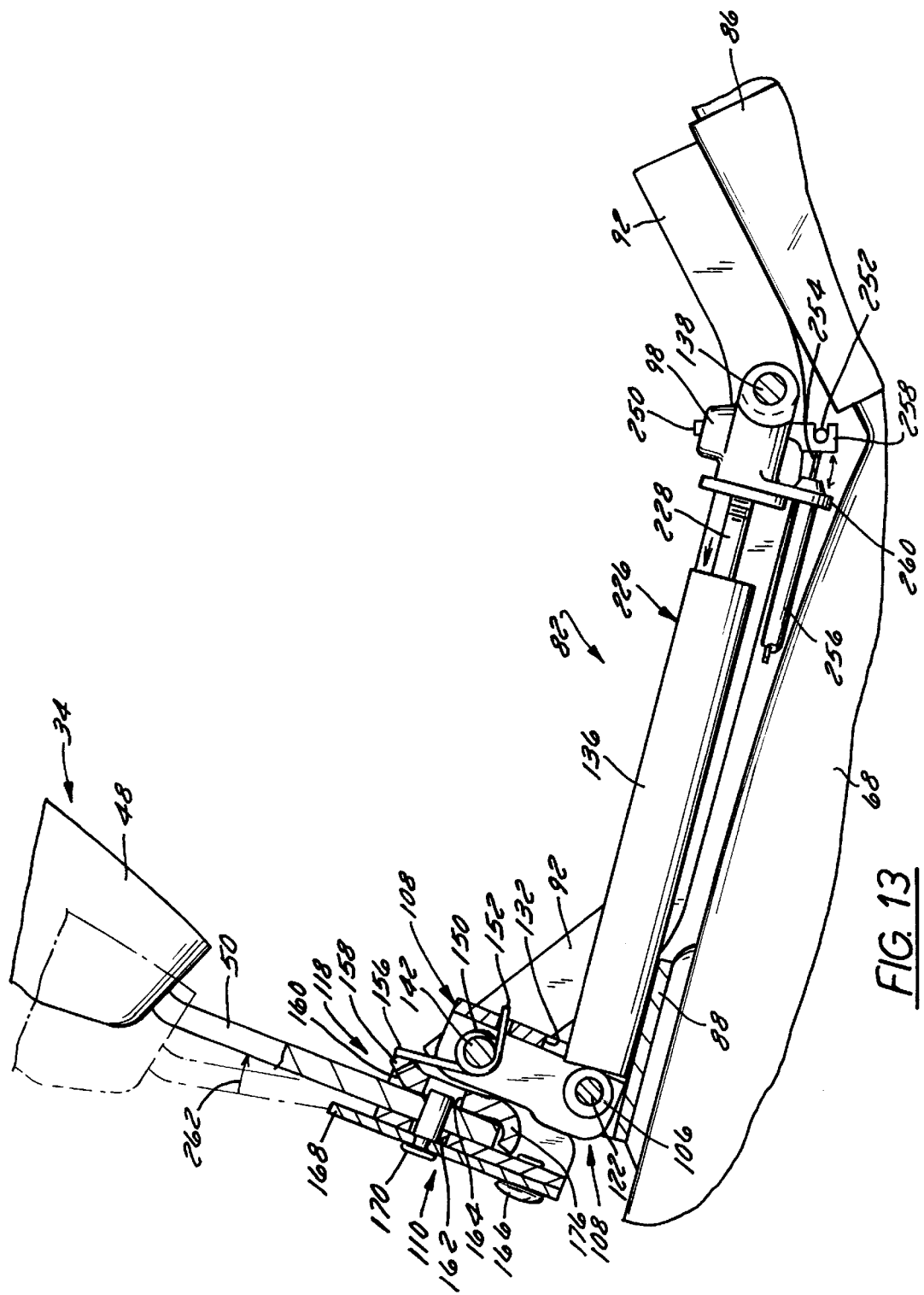
FIG. 13 is a side view of the backrest frame depicting angular adjustment of the backrest.

Referring to FIGS. 12 and 13, the prime mover 82 is constructed and arranged to facilitate selective angular adjustment of the angle of tilt of the backrest 34 all without requiring the use of any tool. The prime mover 82 preferably is a linear actuator of hydraulic, pneumatic, mechanical or electrical construction.

The prime mover 82 has a generally cylindrical drive 224 having one end coupled to the pivot bracket 108 and one end coupled to the frame 80. The drive 224 is constructed and arranged to facilitate select pivoting of the pivot bracket 108 in one direction to enable the backrest 34 to be selectively tilted backwardly and in an opposite direction to enable the backrest 34 to be selectively tilted forwardly. The drive 224 is mounted to a pivot bracket 108 at a mounting point disposed away from its pivot pin 142 so that when the drive 224 is locked a moment is created about the pin 142 which opposes rearward movement of the backrest 34. Preferably, its mounting location is at least about one-half inch or more from the pin 142.

The drive 224 preferably is responsive to the actuator 36. The actuator 36 preferably translates manual interaction into backrest angle adjustment preferably by enabling or disabling adjustment. In the preferred embodiment, the actuator 36 preferably can be moved to a first adjust position that permits angular backrest adjustment and a second lock position that prevents angular adjustment. However, depending upon the construction of drive 224, the actuator 36 can be constructed to control operation of drive 224 in a manner that selectively controls adjustment of the angle of the backrest 34.

In a preferred embodiment, the prime mover 82 or drive 224 is a cylinder 226 having a generally cylindrical housing 230 with a reciprocable piston 228 that extends outwardly from the housing and which is pivotally attached at its free end by yoke 98 to strut 96. At its opposite end, the mounting eye 106 attaches the cylinder 226 to pin 122 pivotally mounting the cylinder 226 to pivot bracket 108.

If desired, the cylinder 226 can be a hydraulic, pneumatic, or mechanical cylinder that can be electrically powered. If the cylinder 226 is a hydraulic or pneumatic cylinder, the assembly 74 includes a source of hydraulic fluid or air (not shown) under pressure delivered to the cylinder 226 to increase or decrease the angle of tilt of the headrest by controlled and selective extension or retraction of the piston 228. Such a design preferably includes a hydraulic fluid pump or compressor (not shown) for controlled pressurized fluid or gas delivery to the cylinder 226. Power to drive the pump or compressor motor preferably is provided in the form of electricity from the electrical generation system (not shown) of the motorcycle.

As is shown in more detail in FIG. 12, the cylinder 226 preferably is a rigid-in-compression gas spring. The cylinder 226 is hollow and divided into two internal chambers 232 and 234 by a piston head 236 sealed against its sidewall 230 by an O-ring 238. Within at least one cylinder chamber is a gas, that preferably is nitrogen, and within at least one cylinder chamber is a fluid, that preferably is a petroleum based oil. Preferably, both chambers 232 and 234 can simultaneously have both gas and oil.

The piston head 236 is also a valve that is constructed and arranged to selectively permit fluid or gas to controllably migrate through an orifice 240 in the piston head 236 between chambers 232 and 234 thereby permitting the piston head 236 to move relative to the cylinder 226. Of course, piston movement translates into backrest tilt adjustment. The valve 236 has a valve stem 242 with a diametrically necked down portion 244 adjacent the piston head 236 that provides a passage 240 through which gas and/or fluid can pass when a seat 246 of the stem 242 is unseated.

The valve stem 242 is an elongate rod 248 that is slidably coaxially received in the hollow piston 228 and has one end that extends outwardly from the free end of the piston 228 and bears against a pivotable valve trigger arm 250 operably coupled to the actuator 36. When the valve stem rod 248 is urged by the trigger arm 250 into the piston 228, its valve seat 246 unseats from the piston head 236 opening the valve 1) allowing fluid and/or gas to freely pass through the orifice 240 and diametrically necked down portion 244 between chambers 232 and 234, 2) permitting the piston 228 to be easily move relative to the cylinder housing 230, and 3) thereby permitting the tilt of the backrest 34 to be changed.

When the valve stem rod 248 is displaced in the opposite direction its seat 246 bears against the piston head 236, generally in the manner depicted in FIG. 12, preventing fluid and gas from flowing between chambers, thereby locking the piston 228 in place. Thus, when the valve seat 246 is seated, the cylinder 226 is rigid in compression thereby causing it to resist further rearward tilting of the backrest 34 from the position the backrest occupied when the stem 242 is seated. A pressure differential between chambers 232 and 234 urges the valve stem rod 248 outwardly of the piston 228 against the trigger arm 250 when the actuator 36 is released urging the rod 248 to the locked position when the actuator is released 36.

The trigger comprises an arm 250 attached by a pivot 252 to the mounting yoke 98. The yoke 98 mounts the end of the piston 228 to the strut 96. The trigger 250 pivots between an operating position permitting the piston 228 and a locking position that is disposed away from the operating position which locks the piston 228 in place locking the angular adjustment setting of the cylinder. At the free end of the trigger 250 is a receptacle 258 for receiving a cable mounting knob 252 of a cable filament 254 slidably received inside a cable sheath 256 connected to the actuator 36. The cable sheath 256 is fixedly mounted by a bracket 260 to the yoke 96.

During operation, tension applied by the actuator 36 to the cable filament 254 urges the trigger arm 250 toward the piston 228 which in turn pushes the valve stem rod 248 into the piston 228 unseating the valve 246 and enabling backrest angle adjustment. Preferably, the cylinder 226 is in its released position permitting angular backrest adjustment when the trigger arm 250 bears against the cable mounting bracket 260. Release of tension of the cable filament 254 allows pressure within the cylinder 226 to urge the valve stem rod 248 outwardly seating the valve 246 returning the trigger arm 250 to the cylinder locking position shown in FIG. 12.

Referring to FIG. 3, the actuator 36 preferably comprises a latch handle 72 which can be manually urged at least slightly outwardly relative to its housing 62 to an operating position that causes the piston 228 to be released so it can freely move relative to the cylinder housing 230 to adjust backrest tilt. As the latch handle 72 is urged outwardly toward its released position shown in phantom in FIG. 4, it pulls the cable filament 254 which in turn pulls the trigger arm 250 toward the cable mounting bracket 260. The bracket 260 preferably also serves as a trigger stop.

To adjust the angle of tilt of the backrest 34 while the valve seat 246 is unseated and the latch handle 72 in its released position, the backrest 34 preferably is manually grasped to manipulate it to the desired angular position. Referring to FIG. 13, as the backrest 34 is urged rearwardly, the backrest mounting bracket 110 and pivot bracket 108 pivot counterclockwise about pivot pin 142 moving the cylinder housing 230 toward strut 96. As the housing 230 moves toward the strut 96, the piston 228 is retracted into the housing 230.

Without manually urging the backrest 34 backwardly while the latch handle 72 in its released position, the backrest 34 will be tilted forwardly in the direction shown by arrow 262 in FIG. 13. This is because the rigid-in-compression gas spring 226 extends the piston 228 with force from the cylinder housing 230 when the valve stem seat 246 is unseated because of the internal construction and arrangement of the gas spring 226, namely pressure differential between chambers 232 and 234. As the piston 228 is extended from the cylinder housing 230, it pivots the pivot bracket 108 and mounting bracket 110 clockwise pivoting the backrest 34 forwardly in the manner depicted in FIG. 13.

When the backrest 34 is finally located in the desired position, the latch handle 72 is released returning it to its housing 62 to a lock position that ultimately fixes the angle adjustment setting. When the latch handle 72 is released, the pressure within chamber 232 urges the seat 246 against the piston head 236 preventing any further flow between chambers 232 and 234 thereby locking the piston 228 in place thereby preventing rearward movement of the backrest 34 and post 50.

Figure 14:
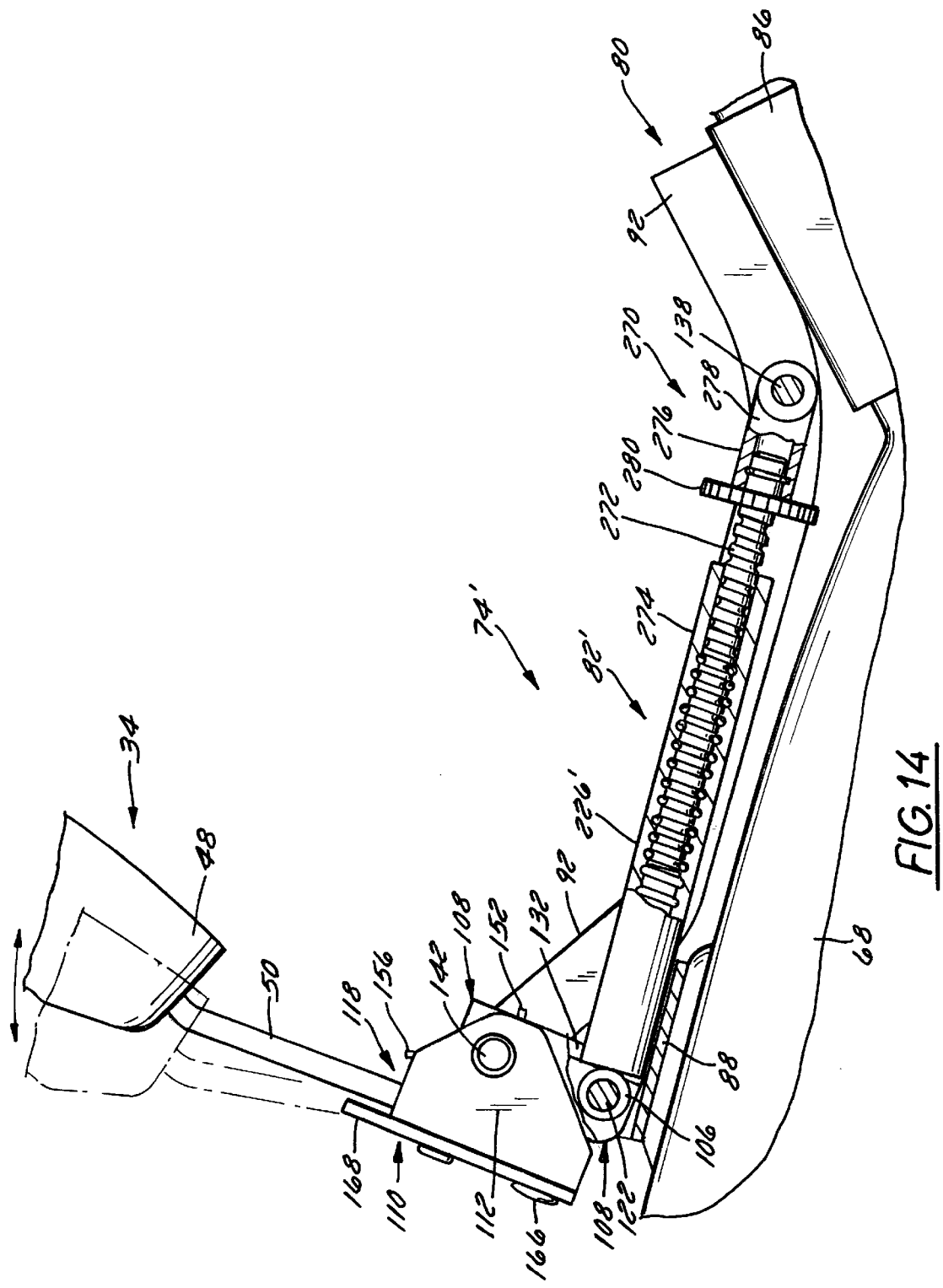
FIG. 14 is a side view of a second preferred backrest adjustment assembly that utilizes a ballscrew as its prime mover.
Figure 15:
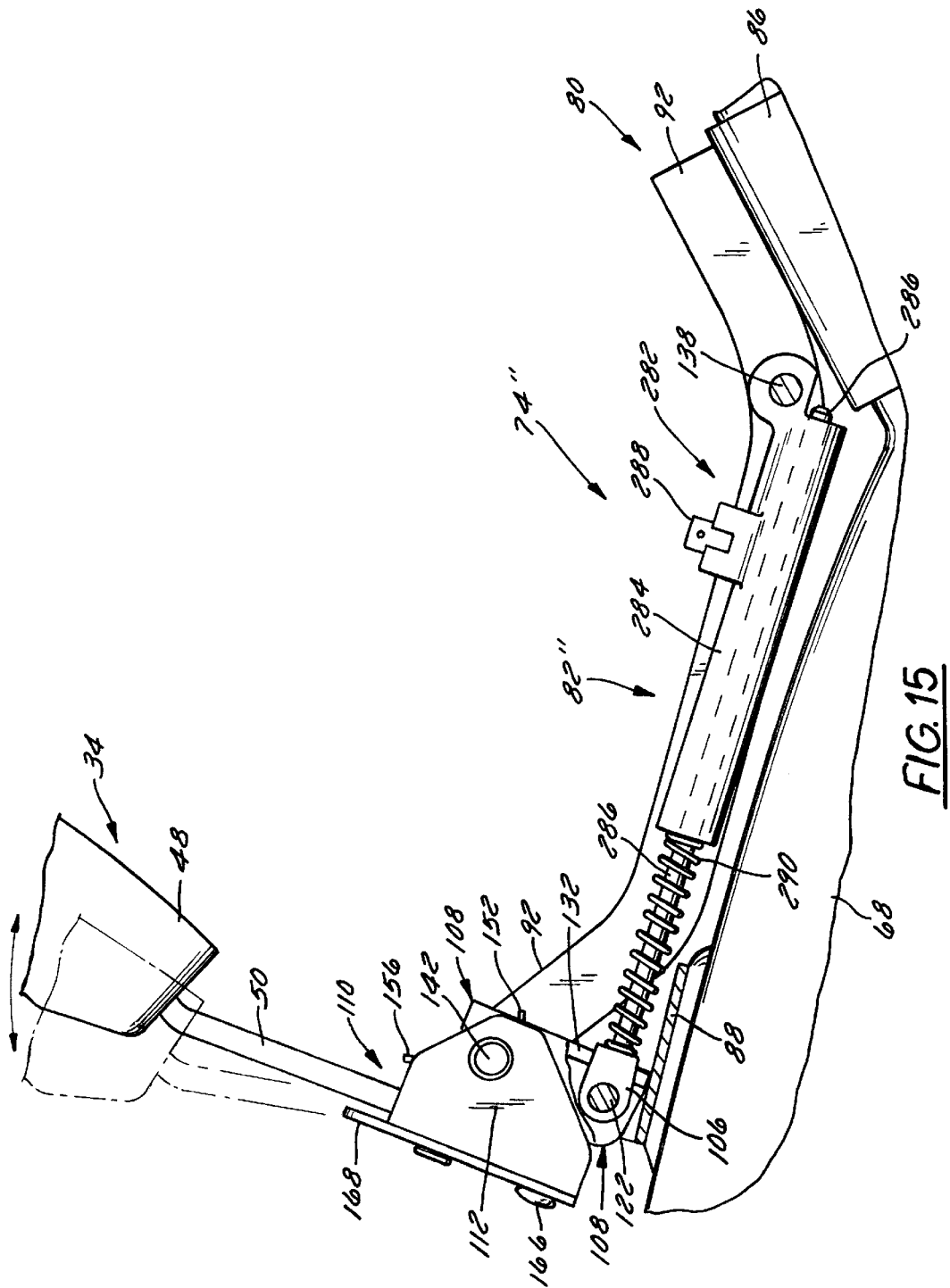
FIG. 15 is a third preferred backrest adjustment assembly that uses a mechanical spring as its prime mover.

Another preferred prime mover embodiment is shown in FIG. 14. Referring to FIG. 14, the prime mover 82' is a ballscrew assembly 270 connected at one end to pivot bracket 108 and connected at its other end to strut 96. The ballscrew assembly 270 comprises a cylinder 226' that is a ball nut 274 that threadably receives a threaded shaft 272. The free end of the shaft 272 is rotatively received in a pocket 276 of a mounting yoke 278 pivotally attached to the frame 80.

As the threaded shaft 272 of the ballscrew assembly 270 rotates in one direction, it displaces the cylinder 226' or ballscrew nut 274 toward the rear of the seat 32 to tilt the backrest 34 forwardly or at least forwardly move the adjusted angular position of the backrest 34. As the shaft 272 rotates in the opposite direction, it displaces the ballscrew nut 274 in the opposite direction causing the backrest 34 to tilt further rearwardly or at least move the adjusted angular position of the backrest 34 rearwardly.

Either the shaft 272 or ballscrew nut 274 carries a wheel, knob or gear to effect relative rotation between the shaft 272 or nut 274. As is shown in FIG. 13, the shaft 272 has a gear 280 that can be manually engaged to rotate the shaft 272 or can be driven by a motor, hydraulic or pneumatic pump, or other source of rotational power. Of course, such a motor or pump preferably is powered by the electrical power generation system (not shown) on board the motorcycle 30. If desired, the assembly 270 can be constructed such that manipulation of actuator 36 effects relative rotation between shaft 272 and nut 274.

A still further prime mover embodiment is shown in FIG. 14. Referring to FIG. 14, the prime mover 82" is a mechanical or hydraulic spring 282. Preferably, the mechanical spring 282 comprises a linear position control device 282 that can be released so as to enable adjustment and can be locked so as to prevent adjustment. Preferably, the mechanical spring 282 is a mechanical or hydraulic position control lock such as a mechanical position control lock made and marketed under the tradename MECHLOK by P.L Porter Co., 6355 De Soto Avenue, Woodland Hills, Calif. 91367 or a hydraulic position control lock made and marketed by P.L. Porter Co. under the tradename HYDROLOK.

The linear position control locking device 282 has a cylinder 284 into which a reciprocable piston 286 is received. A locking device (not shown) within the cylinder 284 permits the piston 286 to move when its trigger 288 is rotated to the adjust position and prevents movement of the piston 286 when the trigger 288 is rotated to the lock position. The locking device is constructed and arranged to grasp a portion of the piston 286 when in the trigger 288 is in the lock position and release the piston 286 when the trigger is moved by actuator 36 to the release position. A biasing spring 290 can be coaxially received over the piston 286 to urge the piston 286 outwardly from or inwardly into the cylinder when the trigger 288 is in the adjust position.

In one preferred embodiment, the locking device is a spring biased sleeve (not shown) inside the cylinder 284 that slidably telescopically receives a portion of the piston 286. Preferably, the trigger 288 extends outwardly from the sleeve and is coupled to one end of cable 254. Movement of actuator 36 displaces cable 254 which moves trigger 288 between its adjust and lock positions. When the trigger 288 is moved to the lock position, it rotates the sleeve causing the sleeve to engage the piston 286 preventing the piston 286 from moving relative to the sleeve and thus the cylinder 284. When the trigger 288 is moved to the adjust position, the sleeve disengages from the piston 286 permitting the piston to move relative to the cylinder permitting backrest angle adjustment. To engage the piston 286, the diameter of the sleeve preferably is reduced as it is rotated by the trigger 288 causing the sleeve to constrict tightly around the piston 286.

In operation, when the actuator is moved to its adjust position, it permits the angular adjustment setting to be changed thereby changing the adjusted angular position of the backrest 34. When moved to the adjust position, the backrest 34 preferably is grasped and manipulated to the desired angle. When the desired angle is reached, the actuator is moved to its lock position locking the angular adjustment setting thereby also preventing the adjusted angular position of the backrest 34 from changing.

To adjust the height of the backrest 34, the backrest cushion 48 is grasped and knob 206 is pushed inwardly. With the knob 206 pushed inwardly, the cushion 48 and slide 178 are moved up or down on post 50 until the desired height is reached. When the desired height is reached, the knob 206 is released locking the height of the backrest 34.

When someone is getting on the seat 32, preferably after the position of the backrest 34 has been adjusted, the backrest 34 can be grasped and folded forwardly against the seat cushion 39 such that its actual angular position is forwardly of its adjusted angular position. After the person occupies the seat, the backrest 34 is released and returns to its adjusted angular position. When the seat occupant on the seat sits back putting weight against the backrest 34, the locked prime mover or linear actuator 82 fixes the position of the pivot bracket 108 preventing the backrest 34 from moving rearwardly of the adjusted angular position thereby providing support to the back of the seat occupant increasing his or her comfort as they ride the motorcycle 30.

It is also to be understood that, although the foregoing description and drawings describe and illustrate in detail one or more working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A motorcycle seat comprising:
   a cushion having a seat occupant supporting surface;
   a three-dimensionally contoured seat base underlying the seat cushion;
   a backrest angle adjustment assembly disposed below the seat occupant supporting surface comprising a backrest angle adjustment frame mounted to the seat base, a linear actuator pivotally attached to the backrest angle adjustment frame, and a backrest mounting bracket that is pivotally attached to the backrest angle adjustment frame and pivotally attached to the linear actuator;

a backrest having a post that operably cooperates with the backrest mounting bracket, the backrest being removable from the motorcycle seat; and wherein a portion of the backrest is disposed above the seat occupant supporting surface.

2. The motorcycle seat of claim 1 wherein the backrest angle adjustment assembly is constructed and arranged to permit the angle of the backrest to be adjusted without using any tool.

3. The motorcycle seat of claim 1 wherein the backrest angle adjustment assembly is disposed between the seat occupant supporting surface and the seat base.

4. The motorcycle seat of claim 3 wherein the backrest angle adjustment assembly is disposed underneath the seat cushion.

5. The motorcycle seat of claim 4 wherein the seat base comprises a seat pan and the frame of the backrest angle adjustment assembly is mounted to the seat pan.

6. The motorcycle seat of claim 4 wherein the motorcycle seat has a front and a rear and the backrest angle adjustment assembly is located between the front and rear of the motorcycle seat.

7. The motorcycle seat of claim 6 wherein the linear actuator comprises a cylinder and a reciprocable piston extending from the cylinder wherein movement of the piston relative to the cylinder changes the angle of the backrest.

8. The motorcycle seat of claim 7 wherein the cylinder and piston are longitudinally oriented relative to the motorcycle seat.

9. The motorcycle seat of claim 7 wherein the linear actuator comprises a gas spring.

10. The motorcycle seat of claim 9 wherein the gas spring comprises a rigid-in-compression gas spring.

11. The motorcycle seat of claim 7 wherein the linear actuator comprises a ballscrew assembly.

12. The motorcycle seat of claim 7 wherein the linear actuator comprises a linear motion locking device.

13. The motorcycle seat of claim 4 wherein a) the linear actuator is constructed and arranged 1) to permit the angular position of the backrest to be changed by changing an angular adjustment setting of the linear actuator and 2) to prevent the adjusted angular position of the backrest from being changed by locking its angular adjustment setting and b) further comprising an angular adjustment actuator disposed remote from the linear actuator that cooperates with the linear actuator, the angular adjustment actuator having a first position that enables the angular adjustment setting of the linear actuator to be changed and a position disposed from the first position that prevents the angular adjustment setting of the linear actuator from being changed.

14. The motorcycle seat of claim 13 wherein the angular adjustment actuator can be manipulated between an adjust position permitting the angular adjustment setting of the linear actuator to be changed and a lock position fixing the angular adjustment position of the linear actuator so it cannot be changed.

15. The motorcycle seat of claim 14 wherein the angular adjustment actator is accessible by an occupant of the motorcycle seat.

16. The motorcycle seat of claim 15 further comprising a cable coupling the angular adjustment actuator to the linear actuator for communicating movement of the angular adjustment actuator to the linear actuator.

17. The motorcycle seat of claim 15 wherein the cushion of the motorcycle seat further comprises a sidewall and the angular adjustment actuator is disposed in the sidewall.

18. The motorcycle seat of claim 15 wherein the cushion of the motorcycle seat further comprises a sidewall and the angular adjustment actuator is carried by the sidewall.

19. The motorcycle seat of claim 3 further comprising a substantially rigid shroud attached to the seat base that 1) overlies at least a portion of the backrest angle adjustment assembly and 2) is disposed below the seat occupant supporting surface.

20. The motorcycle seat of claim 1 wherein the mounting bracket assembly further comprises a pivot bracket 1) pivotally attached to the linear actuator and 2) pivotally attached to the backrest angle adjustment frame and wherein the backrest mounting bracket 1) operably cooperates with the pivot bracket and 2) has a pocket for receiving and releasably retaining the backrest post.

21. The motorcycle seat of claim 20 wherein the backrest mounting bracket is pivotally attached to the pivot bracket for enabling the backrest mounting backrest to be pivoted relative to the pivot bracket.

22. The motorcycle seat of claim 21 further comprising a torsion spring operably connected to the pivot bracket and backrest mounting bracket for urging the backrest mounting bracket against the pivot bracket wherein the pivot bracket and backrest mounting bracket are constructed and arranged to allow the backrest to be pivoted forwardly and toward the seat occupant supporting surface.

23. The motorcycle seat of claim 1 wherein the backrest further comprises a cushion mounted to the backrest post by a backrest height adjustment assembly constructed and arranged 1) to permit the backrest cushion to be selectively moved relative to the post and 2) lock the position of the backrest cushion such that it cannot move relative to the post.

24. The motorcycle seat of claim 23 wherein the backrest height adjustment assembly is constructed and arranged to permit the cushion to be selectively moved relative to the post without requiring any tool.

25. The motorcycle seat of claim 1 wherein the the backrest post has a slot with a plurality of spaced apart detents, and the backrest further comprises 1) a backrest cushion, 2) a slide carrying the backrest cushion with the slide having a channel that slidably telescopically receives the backrest post and a bore in communication with the channel, 3) a shaft received in the bore having i) a diameter that creates an interference between the shaft and the detents of the slot and ii) a diametrically necked down portion, and 4) wherein the shaft is movable between an adjust position where the diametrically necked down portion is received in the slot permitting the backrest cushion and slide to move relative to the backrest post and a lock position wherein the diametrically necked down portion is disposed out of the slot such that the shaft is received in a detent preventing relative movement between the slide and backrest post.

26. The motorcycle seat of claim 25 further comprising a spring and wherein the shaft further comprises a head and wherein the spring is disposed between the head and the slide for urging the shaft toward the lock position.

27. The motorcycle seat of claim 1 further comprising a motorcycle frame to which the motorcycle seat is mounted and wherein the linear actuator is operably attached to the motorcycle frame.

28. The motorcycle seat of claim 27 wherein the linear actuator is disposed in a lengthwise direction relative to the motorcycle seat between the front of the motorcycle seat and the rear of the motorcycle seat.

29. The motorcycle seat of claim 1 further comprising:
2) a generally rigid shroud attached to the seat base; and
3) wherein the shroud is disposed between the linear actuator and the seat occupant supporting surface.

30. The motorcycle seat of claim 1 wherein the backrest further comprises a post and the cushion has an opening permitting the post of the backrest to be inserted into the backrest mounting bracket.

31. The motorcycle seat of claim 30 wherein the cushion is comprised of a pair of adjacent cushions, the opening is disposed between the adjacent cushions, and the post extends into the opening between the adjacent cushions and engages the backrest mounting bracket.

32. A motorcycle seat comprising:
   a) a cushion having a seat occupant supporting surface;
   b) a seat pan underlving the cushion;
   c) a backrest angle adjustment assembly disposed underneath the seat occupant supporting surface comprising 1) a frame mounted to the seat pan, 2) a linear actuator carried by the frame, the linear actuator i) overlying the seat pan, ii) oriented longitudinally relative to the seat pan, and iii) having a housing and a rod movable relative to the housing that extends from the housing, 3) a bracket pivotally attached to the frame and pivotally attached to the linear actuator, and 4) wherein the linear actuator is constructed and arranged i) to be displaced relative to the frame to change the angular position of the bracket and ii) to be locked thereby preventing the angular position of the bracket from being changed;
   c) a backrest operably coupled to the bracket; and
   d) wherein changing the angular position of the bracket by displacing the linear actuator changes the angular position of the backrest.

33. The motorcycle seat of claim 32 further comprising a manipulable actuator in operable cooperation with the linear actuator wherein the manipulable actuator can be manipulated by a seat occupant between an adjust position permitting the angular position of the backrest to be changed and a lock position preventing the angular position of the backrest from being changed.

34. The motorcycle seat of claim 33 further comprising a cable coupling the manipulable actuator to the linear actuator.

35. The motorcycle seat of claim 33 wherein the seat cushion has a sidewall and the manipulable actuator is disposed in the sidewall of the seat cushion.

36. The motorcycle seat of claim 32 further comprising a shroud 1) that is disposed underneath the seat cushion, 2) that overlies at least a portion of the linear actator, and 3) that overlies the seat pan.

37. The motorcycle seat of claim 32 wherein the backrest further comprises a post and the cushion has an opening permitting the post of the backrest to be inserted into the bracket.

38. The motorcycle seat of claim 37 wherein the cushion is comprised of a pair of adjacent cushions, the opening is disposed between the adjacent cushions, and the post extends into the opening between the adjacent cushions and operably attaches to the bracket.

39. A motorcycle seat comprising:
   a) a seat cushion having a seat occupant supporting surface;
   b) a backrest mounting bracket assembly comprising a frame disposed underneath the seat occupant supporting surface, a first bracket attached to the frame and disposed below the seat occupant supporting surface, a second bracket pivotally attached to the first bracket with the second bracket having 1) a backrest post retaining pocket and 2) being disposed below the seat occupant supporting surface, and a biasing element in operable cooperation with the first bracket and the second bracket that urges the second bracket toward the first bracket;
   c) a backrest having a post received and releasably retained in the backrest post retaining pocket of the second bracket;
   d) wherein the backrest can be manually pivoted toward the seat occupant supporting surface of the seat cushion when it is received in the backrest post retaining pocket causing the second bracket to pivot away from the first bracket and when the backrest is released, after being manually pivoted toward the seat occupant supporting surface, the backrest pivot away from the seat occupant supporting surface until the second bracket bears against the first bracket.

40. The motorcycle seat of claim 39 wherein the cushion has an opening permitting the post of the backrest to be inserted into the second bracket.

41. The motorcycle seat of claim 40 wherein the cushion is comprised of a pair of adjacent cushions, the opening is disposed between the adjacent cushions, and the post extends into the opening between the adjacent cushions when it is received and releasably retained in the backrest post retaining pocket of the second bracket.

42. A motorcycle seat mounted to a motorcycle and having a front and rear comprising:
   a) a seat base;
   b) a seat cushion carried by the seat base;
   c) a backrest;
   d) a backrest angle adjustment assembly comprising 1) a prime mover in operable cooperation with the backrest and 2) an angular adjustment actuator operably connected to the prime mover for controlling operation of the prime mover so as to enable an angular position of the backrest to be adjusted;
   e) wherein the backrest angle adjustment assembly further comprises a pair of spaced apart and longitudinally extending tubular braces mounted to the seat base, a strut interconnecting the braces at or adjacent one end of the braces, a pivot pin interconnecting the braces at or adjacent an opposite end of the braces, and a pivot bracket pivotally carried by the pivot pin with the pivot bracket operably carrying the backrest; and
   f) wherein the prime mover comprises a linear actuator having a housing and a reciprocable piston that extends from the housing, wherein 1) the housing is mounted to one of the pivot bracket and the strut and 2) the piston is mounted to the other of the pivot bracket and the strut.

43. The motorcycle seat of claim 42 wherein the angular adjustment actuator is coupled to the linear actuator by a cable.

44. The motorcycle seat of claim 43 wherein the seat cushion further comprises a sidewall and the angular adjustment actuator is carried by the sidewall of the seat cushion.

45. The motorcycle seat of claim 42 wherein the angle of the backrest can be adjusted to change its angle of inclination relative to the front or rear of the seat.

46. The motorcycle seat of claim 42 wherein the linear actuator comprises a gas spring.

47. The motorcycle seat of claim 46 wherein the gas spring comprises a rigid-in-compression gas spring.

48. The motorcycle seat of claim 42 further comprising a mounting bracket for receiving and releasably retaining the backrest wherein the mounting bracket is pivotally coupled to the pivot bracket for enabling the backrest to pivot forwardly toward the front of the seat.

49. A motorcycle seat mounted to a motorcycle comprising:

a) a seat frame;
b) a seat cushion supported on the frame and having a seat occupant supporting surface;
c) a backrest having a backrest cushion and a mounting post;
d) a backrest angle adjustment assembly disposed between the seat frame and the seat occupant supporting surface, the backrest angle adjustment assembly constructed and arranged to permit angular adjustment of the backrest relative to the seat occupant supporting surface without using of any tool
e) a backrest mounting bracket carried by the backrest angle adjustment assembly constructed and arranged to receive and retain the backrest post;
f) a slide mounting the post to the backrest cushion and which is constructs and arranged to permit adjustment of the position of the cushion relative to the post without using any tool; and
g) wherein the backrest angle adjustment assembly includes a linear actuator disposed between the seat cushion and the seat frame, the linear actuator being operable pivotally connected to the backrest mounting bracket.

50. The motorcycle seat of claim 49 wherein the linear actuator comprises a cylinder that is pivotally coupled to the backrest mounting bracket by a bracket disposed between the backrest mounting bracket and the cylinder.

51. The motorcycle seat of claim 49 wherein the post has an elongate slot with a plurality of spaced apart detents and the slide has a shaft with a diametrically necked down portion for being received in the slot to enable the position of the backrest cushion relative to the post to be adjusted and preventing adjustment when the diametrically necked down portion is disposed beyond the slot.

52. The motorcycle seat of claim 51 wherein the shaft has a knob and a spring disposed between the knob and slide and wherein the knob is manually urged inwardly toward the slide to position the diametrically necked down portion of the shaft in the slot in the post and when the knob is released the diametrically necked down shaft portion is disposed beyond the slot.

53. A seat for a motorcycle having a front, a rear, and a seat occupant supporting surface comprising:
a) a motorcycle frame to which the seat is mounted;
b) a backrest angle adjustment frame that is carried by the motorcycle frame and which is disposed below and underneath the seat occupant supporting surface of the seat;
c) an elongate linear actuator having a pair of spaced apart ends wherein the linear actuator 1) is disposed underneath the seat occupant supporting surface and between i) the front of the seat and ii) the rear of the seat, 2) extends parallel to a lengthwise direction of the seat, and 3) has one of its ends mounted to the backrest angle adjustment frame;
d) a first bracket that is 1) pivotally mounted by a first pivot to the other of the ends of the linear actuator and 2) pivotally mounted by a second pivot to the backrest angle adjustment frame wherein the first pivot and second pivot are spaced apart and not coaxial;
e) a second bracket pivotally mounted to the first bracket and having a retainer pocket; and
f) a backrest having a post that has one end that is received in the retainer pocket of the second bracket.

54. A seat for a motorcycle having a front, a rear, and a seat occupant supporting surface comprising:
a) a seat pan;
b) a cushion carried by the seat pan and which has a length longer than its width;
c) a motorcycle frame to which the seat pan is mounted;
d) a backrest mounting frame, disposed below the seat occupant supporting surface and underneath at least a portion of the seat occupant supporting surface, the backrest mounting frame comprising at least one brace carried by the seat pan and oriented in a lengthwise direction relative to the seat cushion;
e) a first mount disposed 1) below the seat occupant supporting surface, and 2) adjacent one end of the at least one brace wherein the first mount is attached to the at least one brace;
f) a second mount disposed 1) below the seat occupant supporting surface, and 2) adjacent one end of the at least one brace wherein the second mount is attached to the at least one brace;
g) a first bracket pivotally mounted to the second mount;
h) a second bracket pivotally mounted to the first bracket and the second bracket having a pocket therein;
i) a linear actuator, disposed underneath the seat occupant supporting surface, the linear actuator comprising a base having an end and a reciprocable piston extending therefrom having an end wherein 1) one of the end of the base and the end of the piston is pivotally mounted to the first mount and 2) the other one of the end of the base and the end of the piston is pivotally mounted to the first bracket such that the linear actuator is disposed adjacent the at least one brace and is oriented generally in a lengthwise direction relative to the seat cushion;
j) an actuator accessible by an occupant of the seat that is operably connected to the linear actuator and which has 1) a first position permitting the piston to move axially relative to the base to change an angular backrest setting by changing the angle of the first bracket and 2) a second position preventing the piston from moving axially relative to the base preventing the angular backrest setting from being changed;
k) a backrest having a post extending therefrom that is received in the pocket in the second bracket;
l) a biasing element urging the second bracket toward the first bracket while permitting the second bracket to pivot forwardly relative to the first bracket toward the front of the seat when the backrest is urged forwardly toward the front of the seat;
m) wherein the angular backrest setting can be changed when the actuator is disposed in the first position and the angular backrest setting cannot be changed when the actuator is disposed in the second position; and
n) wherein changing the angular backrest setting changes the angle of the backrest relative to the seat occupant supporting surface when the second bracket is urged against the first bracket.

* * * * *